United States Patent [19]
Hashimoto et al.

[11] Patent Number: 5,888,456
[45] Date of Patent: Mar. 30, 1999

[54] CATALYTIC CONVERTER

[75] Inventors: Shigeharu Hashimoto; Takahisa Kaneko, both of Farmington Hills, Mich.; Tomoharu Kondo, Toki; Yasushi Kato, Handa, both of Japan

[73] Assignee: NGK Insulators, Ltd., Japan

[21] Appl. No.: 770,777

[22] Filed: Dec. 20, 1996

[30] Foreign Application Priority Data

Jan. 19, 1996 [JP] Japan ...................................... 8-007082

[51] Int. Cl.⁶ ...................................................... F01N 3/10
[52] U.S. Cl. .......................... 422/174; 422/171; 422/177; 422/180; 422/199; 60/300; 55/DIG. 30
[58] Field of Search ..................................... 422/171, 177, 422/180, 211, 222, 174, 199; 60/300; 55/DIG. 30

[56] References Cited

U.S. PATENT DOCUMENTS

| | | | |
|---|---|---|---|
| 3,768,982 | 10/1973 | Kitzner et al. | 422/174 |
| 5,063,029 | 11/1991 | Mizuno et al. | 422/174 |
| 5,202,548 | 4/1993 | Kondo et al. | 422/174 |
| 5,264,186 | 11/1993 | Harada et al. | 422/174 |
| 5,323,607 | 6/1994 | Tanaka et al. | 60/274 |
| 5,614,155 | 3/1997 | Abe et al. | 422/174 |

FOREIGN PATENT DOCUMENTS

| | | |
|---|---|---|
| 0 579 415 A1 | 1/1994 | European Pat. Off. . |
| 687807 | 12/1995 | European Pat. Off. . |
| 43 02 039 A1 | 7/1994 | Germany . |

OTHER PUBLICATIONS

SAE Technical Paper Series, "A Structurally Durable EHC for the Exhaust Manifold" by Mizuno et al.
Patent Abstracts of Japan—vol. 17, No. 186 (M–1395), Apr. 12, 1993 & JP 04 339122 A (NGK Spark Plug Co), Nov. 26, 1992—abstract.

Primary Examiner—Hien Tran
Attorney, Agent, or Firm—Parkhurst & Wendel

[57] ABSTRACT

A catalytic converter includes a housing, a honeycomb heater fixed to inside the housing, and a catalytic element disposed downstream of the honeycomb heater. The honeycomb heater has a first honeycomb structure made of metal having a first partition wall having a plurality of first throughholes, and at least one electrode for electrifying the first honeycomb structure. The catalytic element fixed to inside the housing and disposed downstream of the honeycomb heater has a second honeycomb structure having a second partition wall having a plurality of second throughholes, and a catalytic compound loaded on the second honeycomb structure. A horizontal cross-section of the honeycomb structure is made smaller than that of the honeycomb structure. Further, a gap between an outflow end surface of the honeycomb structure and an inflow end surface of the honeycomb structure is made large. According to the catalytic converter, a durability of a honeycomb structure, particularly resistance against vibrations extending over a long period of time can be improved while maintaining an exhaust gas purification ability under severe driving conditions. Further, according to the present invention, the temperature of a honeycomb heater can be raised in a short period of time.

17 Claims, 19 Drawing Sheets

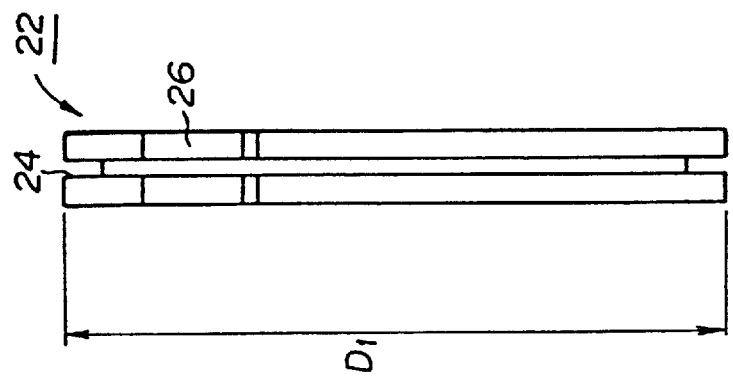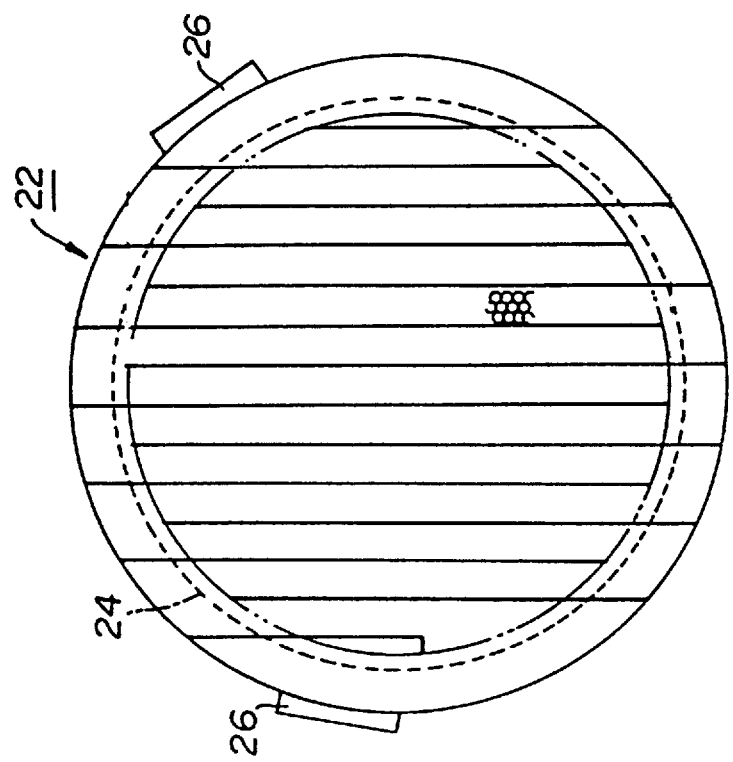

F I G. 1 8
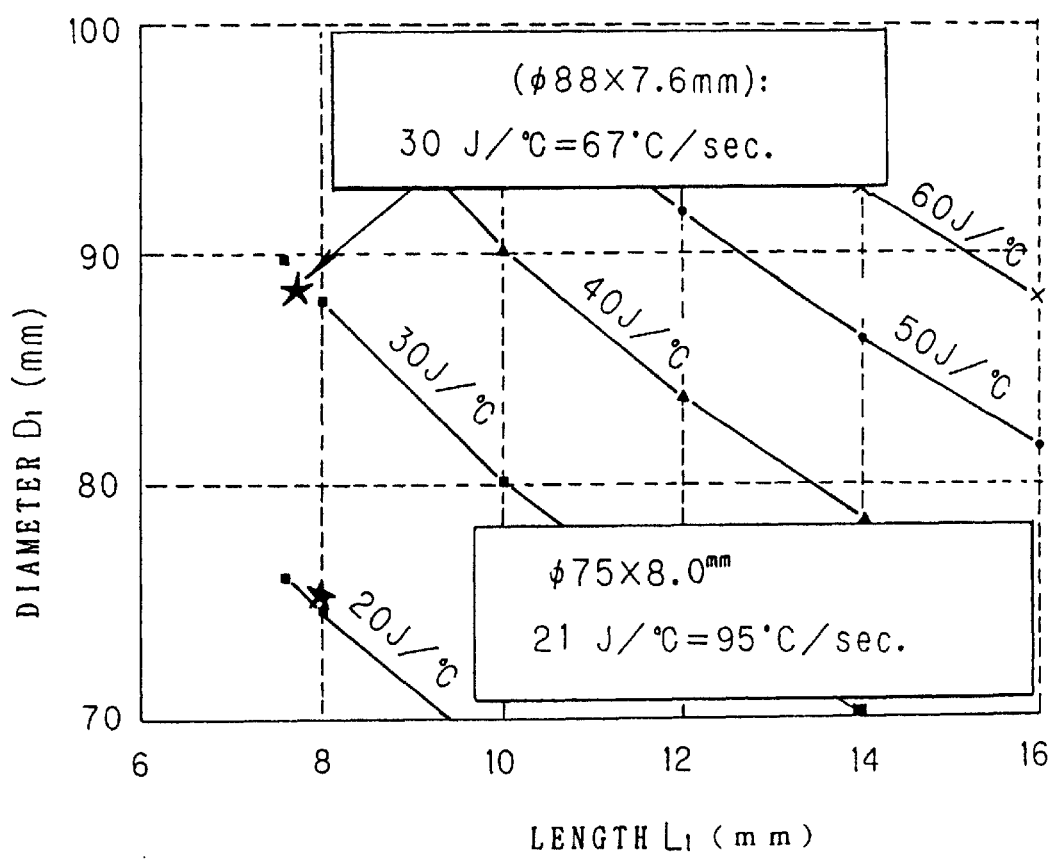

CATALYTIC CONVERTER

BACKGROUND OF THE INVENTION AND RELATED ART STATEMENT

The present invention relates to a catalytic converter which is suitably applicable to purification of an exhaust gas of an automobile, or the like.

Recently, a metallic honeycomb structure has been attracted a good deal of public attention besides a porous ceramic honeycomb structure as a carrier, or the like, for a catalyst for purifying pollutants such as nitrogen oxide ($NO_x$), carbon monoxide (CO), hydrocarbon (HC), and the like, contained in an exhaust gas discharged from an internal combustion engine of an automobile, or the like.

Additionally, there has been earnestly desired development of a heater, or the like, which can reduce a discharge of pollutants upon cold start as regulations on an exhaust gas are tightened.

The present applicant previously proposed a honeycomb heater in which a honeycomb structure is provided with a resistor adjusting mechanism (U.S. Pat. No. 5,063,029). The present applicant further proposed a method for holding a honeycomb heater by covering a circumference of the honeycomb heater with a metallic band by means of an insulating substance such as a ceramic mat, cloth, or the like (U.S. Pat. No. 5,202,548).

The aforementioned method discloses a method for protecting a resister adjusting mechanism of a heater by an insulation. However, the heater disclosed in U.S. Pat. No. 5,063,029 has a possibility that an inorganic adhesive drops off under a severe driving conditions (particularly, vibrations and thermal shocks) of an automobile. The heater disclosed in U.S. Pat. No. 5,202,548 has a possibility that a heater is deformed by horizontal and vertical vibrations, resulting in breakage of a spacer or wear of an insulating mat.

The present applicant has further studied so as to develop a new heater unit which is free from breakage and exfoliation of a honeycomb heater against an expansion or a shrinkage caused by vibrations or thermal shocks under a severe condition of an automobile. The new heater unit was disclosed in SAE Technical Paper Series 940466. The heater unit is very preferable because it hardly has deformation or breakage of a honeycomb heater.

The heater unit has a structure that a honeycomb heater is hold by a housing by means of a metallic, flexible holding member. SAE Technical Paper Series 940466 also discloses a flexible electrode structure, a ring which limits a gas flow, and a disposition of a light-off catalyst downstream of the honeycomb heater.

An embodiment of a constitution of a conventional catalytic converter is hereinbelow described with reference to FIG. 19. Housings 12 and 14 fixedly install a honeycomb heater 20 and a catalytic converter 30. Specifically, a honeycomb heater is fixed to a housing 12 by means of a holding member (not shown) so as to form a heater unit. Similarly, a catalytic element 30 is fixed to a housing 14 by means of a holding member (not shown) so as to form a catalytic unit. When a catalytic converter is produced, a duct 16, the heater unit, and the catalyst unit are fixed.

A numeral number of throughholes are formed in parallel in a fluid-flow direction in a honeycomb structure 22 constituting a honeycomb heater 20 and a honeycomb structure 32 constituting a catalytic element 30. A fluid such as an exhaust gas, or the like, of an internal combustion engine is introduced to an inflow end surface 22s of the honeycomb structure 22 of the honeycomb heater 20 from a duct 16. The fluid, then, passes through the throughholes and flows out of an outflow end surface 22t. An electrode 28 supplies electricity to a honeycomb structure 22, and the fluid is heated upon passing through the throughholes of the honeycomb structure 22.

The fluid flows out of the outflow end surface 22t of the honeycomb structure 22, passes through a gap G, is introduced to an inflow end surface 32s of a honeycomb structure 32 of a catalytic element 30, passes through throughholes, and flow out of an outflow end surface 32t. Since a surface of a partition wall for forming the throughholes in the honeycomb structure 32 is covered with a catalytic composition, active components such as noble metals contained in the catalytic composition remove pollutants such as oxygen nitride, carbon monoxide, hydrocarbon, or the like, in an exhaust gas by oxidation or reduction.

When an exhaust gas has not been warmed, for example, when an engine of an automobile is started up, the catalytic composition of the catalytic element 30 is not activated, and therefore, the pollutants in the exhaust gas cannot be removed. Accordingly, the honeycomb heater 20 heats the exhaust gas up to a light-off temperature or more so as to activate the catalytic composition and improve an efficiency in removing the pollutants in the exhaust gas.

In a conventional catalytic converter, a diameter $D_2$ of an inflow end surface 32s of a honeycomb structure 32 was almost the same as a diameter $D_1$ of the outflow end surface 22t of a honeycomb structure 22. A honeycomb structure 32 constituting a catalytic element 30 is required to have a certain degree of volume to obtain a predetermined exhaust-gas purifying ability by ensuring a surface area for loading a catalytic composition thereon and to obtain an $O_2$ storage (keeping) ability for detecting deterioration of a catalyst.

On the other hand, a catalytic converter is also required not to deteriorate properties of the internal combustion engine and to lower a pressure loss as much as possible caused when the fluid passes through the honeycomb structure 32.

In order to satisfy these requirement, it is preferable to make the diameter $D_2$ of the honeycomb structure 32 constituting the catalytic element 30 as large as possible, and to make a length $L_2$ of the honeycomb structure 22 in the axial direction as short as possible. In that case, the diameter $D_1$ of the honeycomb structure 22 of the honeycomb heater 20 also becomes large. Therefore, as a result there has been a problem that a vibration resistance of the honeycomb structure 22 is lowered, and a risk of breakage of the honeycomb structure 22 in the worst case by vibrations or the like upon driving with a high burden.

When an alternator attached to the internal combustion engine is used as a source for supplying electricity to the honeycomb heater 20, the honeycomb heater 20 is required to have a high resistance of usually 200 mω or more because of properties of the output voltage. In this case, in order to obtain a high resistance, the length $L_1$ of the honeycomb structure 22 is small and the number of slits arranged in the honeycomb structure 22 is high, and thus the aforementioned vibration resistance is highly concerned about.

When the diameter $D_1$ is made small in view of vibration resistance of the honeycomb structure 22, the diameter $D_2$ of the honeycomb structure 32 becomes small. In this case, there are caused problems that a pressure loss increases and output properties of an internal combustion engine deteriorate.

On the other hand, the conventional converter is aimed to rapidly heat the honeycomb structure 32 by a thermal energy obtained by heating a fluid flowing through the honeycomb structure 22 by electrically heating the honeycomb structure 22. Accordingly, a gap G between the honeycomb structures 22 and 32 was formed as small as possible. In this case, a region where a fluid such as an exhaust gas is present in a circumference of the honeycomb heater 20 and a region where exothermic reaction is not caused electrically also in a circumference of a honeycomb structure 22. Accordingly, there has been a problem that a fluid flowing through a circumferential portion 33 of the honeycomb structure 32 is not heated after an engine is started up particularly in a cold season, thereby impeding the exhibition of a purification ability in this range.

As a volume of the honeycomb structure 22 becomes large, a heat capacity of the honeycomb structure 22 becomes large and temperature-rising speed of the honeycomb heater 20 slows down. However, since a honeycomb heater is desired to have a high temperature rapidly, a volume of a honeycomb structure 22 is desirably small.

Further, because of a convenience of designing an exhaust system of an automobile, a diameter of the duct is small, and generally, an area of the inflow end surface 22s of the honeycomb structure 22 is larger than that of the outflow end surface 16s of a duct 16. If so, a fluid flows into a portion of the honeycomb structure 22, and the portion is prone to deform by a heat. This is particularly remarkable when an automobile runs at high speed and caused by both rises in speed and temperature of an exhaust gas. Hence, an area of the inflow end surface 22s of the honeycomb structure 22 is desirably a little larger than that of the outflow end surface 16s of the duct 16.

However, if a volume and an area of a horizontal cross-section of the honeycomb structure 22 are made small, a problem of pressure loss in the honeycomb structure 32 as described above. Therefore, it was difficult to miniaturize the honeycomb structure 22.

Additionally, in a conventional catalytic converter, a gap G between an outflow end surface 22t of a honeycomb structure 22 and an inflow end surface 32s of a honeycomb structure 32 was made small so as to prevent a fluid such as an exhaust gas from being cooled down, i.e., to avoid thermal loss after the fluid flows out of the outflow end surface 22t of the honeycomb structure 22 and before the fluid flows in through the inflow surface 32s of the honeycomb structure 32. For example, the present applicant disclosed in U.S. patent application Ser. No. 08/412,279, now U.S. Pat. No. 5,614,155 a honeycomb structure 22 having a length $L_1$ in the axial direction of 5–20 mm. The honeycomb structure 22 preferably has a volume of 30–150 cm$^3$. When such a honeycomb structure 22 is used, generally, the gap G was determined to be 10 mm or less, and typically 5–8 mm. Incidentally, in U.S. patent application Ser. No. 08/412,279 a distance between the inflow end surface 22s of a honeycomb structure 22 and the outflow end surface 16s of a duct 16 is preferably 3 mm or less.

SUMMARY OF THE INVENTION

In the first aspect of the present invention, a cross-sectional area of the honeycomb structure 22 of the honeycomb heater 20 is made smaller than a cross-sectional area of the honeycomb structure 32, thereby avoiding an increase of a pressure loss in the honeycomb structure 32 and improving a durability of a honeycomb structure, particularly resistance against vibrations extending over a long period of time. Additionally, a heat capacity of the honeycomb structure 22 is also decreased, and thereby a temperature the honeycomb structure 22 can be raised for a short period of time.

In the second and third aspects of the present invention, since a horizontal cross-sectional area of the honeycomb structure 22 is made small, a circumferential portion 33 of a honeycomb heater 32 has a difficulty to be heated. Accordingly, a gap between a honeycomb heater 20 and a catalytic element 30 is formed to be larger than a conventional one so that the whole honeycomb structure 32 is uniformly heated.

In this case, since a temperature-rising ability is improved, a temperature-rising property of the honeycomb structure 32 does not deteriorate even when the gap is made wider.

According to the first aspect of the present invention, there is provided a catalytic converter comprising:
a housing;
a honeycomb heater fixed to inside said housing; and
a catalytic element disposed downstream of said honeycomb heater;
wherein said honeycomb heater comprises:
a first honeycomb structure made of metal having a first partition wall for forming a numerous number of a first throughholes, and at least one electrode for electrifying said first honeycomb structure, attached to said first honeycomb structure; the first honeycomb structure having a first inflow end surface from which a fluid flows into said first throughholes, and a first outflow end surface where a fluid passed through said first throughhole flows out;
said catalytic element comprises:
a second honeycomb structure having a second partition wall for forming a numerous number of a second throughholes, and a catalytic compound loaded on said second honeycomb structure; the second honeycomb structure having a second inflow end surface from which a fluid flows into said second throughholes, and a second outflow end surface where a fluid passed through said second throughholes flow out; and
an area of the second inflow end surface of said second honeycomb structure is 1.2–10 times of an area of the first outflow end surface of said first honeycomb structure.

In the present invention, the area of the second inflow end surface of the second honeycomb structure is preferably 1.3–5 times of the area of the first outflow end surface of the first honeycomb structure.

Further, the area of the second inflow end surface of the second honeycomb structure is more preferably 1.4–3 times of the area of the first outflow end surface of the first honeycomb structure. An angle between an axial direction of the electrode and an axial direction of the first honeycomb structure is preferably 90°–170°. An angle between an axial direction of the electrode and an axial direction of the first honeycomb structure is more preferably 120°–150°.

An area of the first outflow end surface is preferably 64 cm$^2$ or less. An area of the first outflow end surface is more preferably 45 cm$^2$ or less.

According to the second aspect of the invention, there is provided a catalytic converter comprising:
a housing;
a honeycomb heater fixed to inside the housing; and
a catalytic element disposed downstream of the honeycomb heater;

wherein the honeycomb heater comprises:
a first honeycomb structure made of metal having a first partition wall for forming a numerous number of a first throughholes, and at least one electrode for electrifying the first honeycomb structure, attached to the first honeycomb structure; the first honeycomb structure having a first inflow end surface from which a fluid flows into the first throughholes, and a first outflow end surface where a fluid passed through the first throughhole flows out;

the catalytic element comprises:
a second honeycomb structure having a second partition wall for forming a numerous number of a second throughholes, and a catalytic compound loaded on the second honeycomb structure; the second honeycomb structure being a second inflow end surface from which a fluid flows into the second throughholes, and a second outflow end surface where a fluid passed through the second throughholes flow out; and a ratio of G to $D_1$ (G/$D_1$) is 0.13–0.83 (G denotes a gap between the first outflow end surface of the first honeycomb structure and the second inflow end surface of the second honeycomb structure, and $D_1$ denotes a diameter of the first outflow end surface of the first honeycomb structure.).

The ratio of the gap G to the diameter (G/$D_1$) is preferably 0.26–0.65.

According to the third aspect of the present invention, there is provided a catalytic converter comprising:
a housing;
a honeycomb heater fixed to inside the housing; and
a catalytic element disposed downstream of the honeycomb heater;
wherein the honeycomb heater comprises:
a first honeycomb structure made of metal having a first partition wall for forming a numerous number of a first throughholes, and at least one electrode for electrifying the first honeycomb structure, attached to the first honeycomb structure; the first honeycomb structure being a first inflow end surface from which a fluid flows into the first throughholes, and a first outflow end surface where a fluid passed through the first throughhole flows out;

the catalytic element comprises:
a second honeycomb structure having a second partition wall for forming a numerous number of a second throughholes, and a catalytic compound loaded on the second honeycomb structure; the second honeycomb structure having a second inflow end surface from which a fluid flows into the second throughholes, and a second outflow end surface where a fluid passed through the second throughholes flow out; and a ratio of G to $L_1$ (G/$L_1$) is 0.9–6.7 (G denotes a gap between the first outflow end surface of the first honeycomb structure and the second inflow end surface of the second honeycomb structure, and $L_1$ denotes a length of the first honeycomb structure in the axial direction.).

The ratio of G to $L_1$ (G/$L_1$) is preferably 1.3–5.3.

The gap G is preferably 10–50 mm. The gap G is more preferably 20–40 mm.

Preferably, the first inflow end surface of the first honeycomb structure is provided with a duct for introducing a fluid and an area of the first inflow end surface is 1–3 times as large as an area of a third outflow end surface of the duct. More preferably, the first inflow end surface of the first honeycomb structure is provided with a duct for introducing a fluid, and an area of the first inflow end surface is 1–2 times as large as an area of a third outflow end surface of the duct.

The length $L_1$ is preferably 5–15 mm.

The first honeycomb structure is preferably obtained by sintering a compact molded by extrusion molding. The second honeycomb structure is preferably made of ceramic.

BRIEF DESCRIPTION OF THE DRAWINGS

FIG. 2A is a plan view, and FIG. 2B is a side view.

FIGS. 7A and 7B show another embodiment of a honeycomb structure of a honeycomb heater. FIG. 7A is a plan view, and FIG. 7B is a side view.

FIG. 15A shows an embodiment of a catalytic converter of the present invention, and FIG. 15B shows an embodiment of a conventional catalytic converter.

FIG. 18 is a graph showing a correlation between a length $L_1$ and a diameter $D_1$ regarding heat capacity of a honeycomb structure of a honeycomb heater.

DETAILED DESCRIPTION OF THE PREFERRED EMBODIMENT

Figure 1:
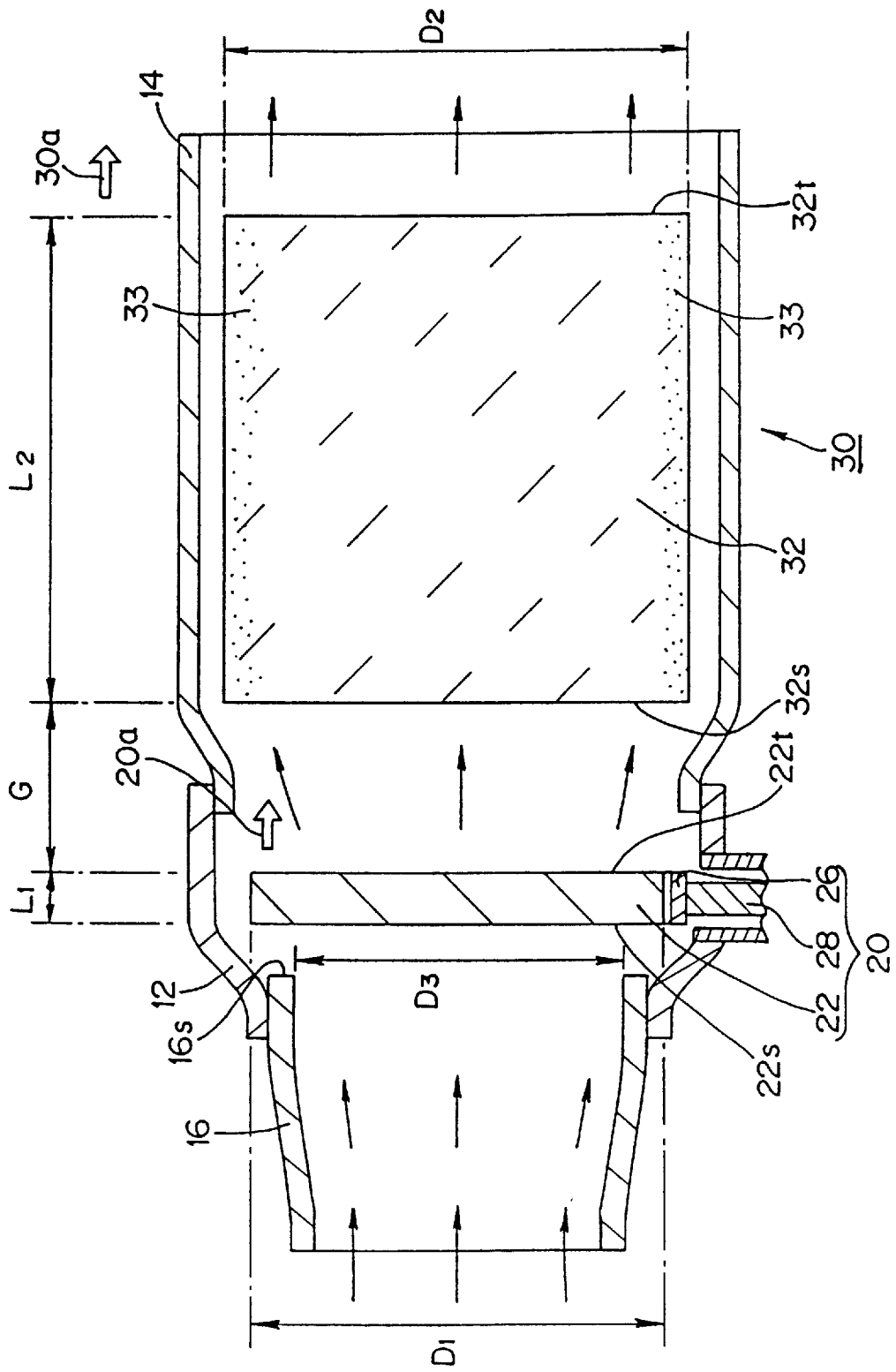
FIG. 1 is a side cross-sectional view showing an embodiment of a catalytic converter according to the present invention.

FIG. 1 is a structural explanatory view showing an embodiment of a catalytic converter of the present invention.

A catalytic converter of the present invention includes a housing 12, a honeycomb heater 20 fixed to inside the housing 12, and a catalytic element 30 fixed to inside the housing 14 and positioned downstream of the honeycomb heater 20. In the present invention, the honeycomb heater 20 itself including the honeycomb structure 22 and the catalytic element 30 itself including the honeycomb structure 32 may be the same as conventional ones. The honeycomb heater 20 includes a metallic first honeycomb structure 22 having a first partition wall for forming a numerous number of first throughholes, and at least one electrode 28 for electrifying the first honeycomb structure 22. The first honeycomb structure 22 has a first inflow end surface 22s through which a fluid such as an exhaust gas flows in the first throughholes and a first outflow end surface 22t though which the fluid flows out of the first throughholes.

The catalytic element 30 fixed to inside a housing 12 and positioned downstream of the honeycomb heater 20 includes a second honeycomb structure 32 having a second partition wall for forming a numerous number of second throughholes and a catalytic composition loaded on the second honeycomb structure 32. The second honeycomb structure 32 has a second inflow end surface 32s through which a fluid such as an exhaust gas flows in the second throughholes and a second outflow end surface 32t through which the fluid flow out of the second throughholes.

In the first aspect of the present invention, an area of a horizontal cross-section of the honeycomb structure 22 was made smaller than that of the honeycomb structure 32.

Specifically, an area of the inflow end surface 32s of a honeycomb structure 32 is 1.2–10 times, preferably 1.3–times, more preferably 1.4–3 times, of an area of the outflow end surface 22t or a honeycomb structure 22.

When an area of the inflow end surface 32s of a honeycomb structure 32 is smaller than 1.2 times of an area of the outflow end surface 22t of a honeycomb structure 22, the length $L_2$ of the honeycomb structure 32 in the axial direction is long, and a pressure loss upon passing of a fluid such as exhaust gas increases. When an area of an inflow end surface 32s of the honeycomb structure 32 is larger than 10 times of an area of the outflow end surface 22t of the honeycomb structure 22, i.e., when $D_2$ of the honeycomb structure 32 is larger than three times of a diameter of the honeycomb structure 22, an exhaust gas heated by the honeycomb heater 20 does not pass the circumferential portion 33 of the honeycomb structure 32, and therefore, a catalytic composition loaded on the circumferential portion 33 is not effectively used.

In the present invention a diameter of the honeycomb structure 22 becomes small, durability (particularly, resistance against vibrations extending over a long period) can be improved. Additionally, the honeycomb structure 22 can be heated for a short period of time after being electrified because the honeycomb structure 22 has a small heat capacity.

Specifically, an area of the outflow end surface 22t of a honeycomb structure 22 is preferably 64 cm$^2$ or less. When the outflow end surface 22t has a shape of a circle, the diameter corresponds to 90 mm or less. More preferably, an area of the outflow end surface 22t of a honeycomb structure 22 is 45 cm$^2$ or less. When the outflow end surface 22t has a shape of a circle, the diameter corresponds to 76 mm.

An average of horizontal cross-sections of the honeycomb structure 32 is preferably 1.2–10 times of a horizontal cross-section of a honeycomb structure 22, more preferably 1.3–5 times, furthermore preferably 1.4–3 times. Incidentally, horizontal cross-sections of a honeycomb structures 22 and 32 are cross-sections perpendicular to the axial direction 20a of the honeycomb structures 22 and 32. Horizontal cross-sections of honeycomb structures 22 and 32 are often formed so as to be parallel to the inflow end surface 22s and 32s and the outflow end surfaces 22t and 32t, respectively. An average of horizontal cross-sections of the honeycomb structure 22 is preferably 64 cm$^2$ or more, more preferably 45 cm$^2$ or less. Incidentally, reference numeral 30a designates a direction of fluid flow.

Figure 2:
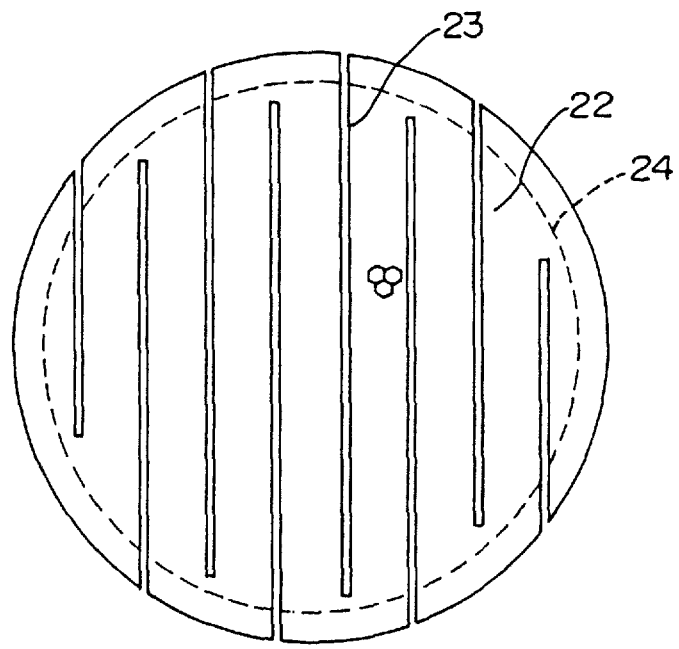
FIGS. 2A and 2B show an embodiment of a honeycomb structure of a honeycomb heater.
Figure 2:
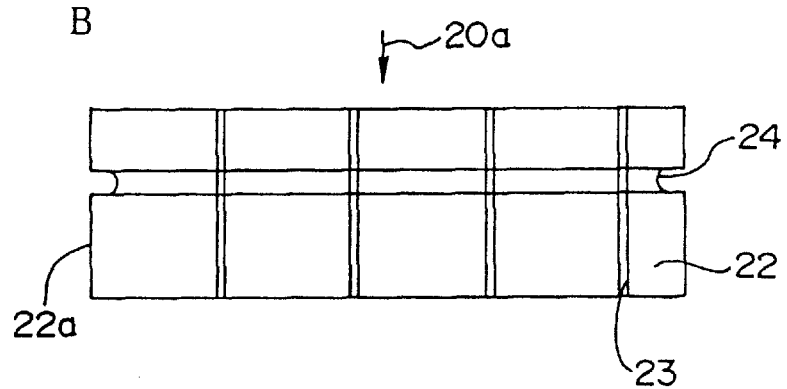

FIGS. 2A and 2B are explanatory views showing an embodiment of the honeycomb structure 22 of the honeycomb heater 20. The honeycomb structure 22 may be the same as a conventional one.

As U.S. Pat. No. 5,063,029 discloses, slits 23 are formed in the honeycomb structure 22 so as to block a passage of current. In FIG. 2B, slits 23 are formed to be parallel to the axial direction 20a of a honeycomb structure 22. However, it is not necessary that they are parallel to the axial direction 20a. Instead of slits, an insulating material may be used to block the passage of current.

To the circumferential surface of the honeycomb structure 22, at least one electrode 28 for electrifying. The electrode, here, means a general term for terminals (including terminals such as a ground for applying a voltage to the heater). The electrode 28 is electrically connected to a honeycomb structure by means of a plate 26 or the like.

A groove 24 is formed around the circumferential surface 22a of the honeycomb structure 22. An end of a holding member for fixing the honeycomb structure 22 to the housing 12 has a shape along the shape of the groove 24. The groove 24 can be obtained by subjecting a sintered honeycomb structure 22 to cylindrical grinding. Alternatively, when a honeycomb structure is molded by extrusion of a powdered metal, the groove can be previously formed to a compact for the honeycomb structure in various manners.

As obvious from the embodiment showing in FIG. 1, in the second and third aspects of the present invention, a gap G between an outflow end surface 22t of the honeycomb structure 22 and an inflow end surface 32s of the honeycomb structure 32 was widened. In a catalytic converter of the present invention, the gap G is preferably 10–50 mm, more preferably 20–40 mm. In this range, a thermal loss of an exhaust gas and a temperature rising property in circumferential portion of the honeycomb structure 32 are well balanced. That is, when the gap G is 10 mm or more, an exhaust gas heated by a honeycomb heater 20 can extend in the direction perpendicular to the axial direction 20a of the honeycomb structure 22 until the exhaust gas flows in the honeycomb structure 32 through its inflow end surface 32s, and the circumferential portion 33 of the honeycomb structure 32 can be rapidly heated, thereby improving a responding ability of the circumferential portion 33 of the honeycomb structure 32. When the gap G is 50 mm or smaller, a heat loss of an exhaust gas can be decreased to a certain degree.

How much an exhaust gas flew out of the honeycomb structure 22 can extend in the diametrical direction perpendicular to the axial direction 20a of a honeycomb structure 22 until the gas flow into the honeycomb structure 32 depends on a ratio ($G/D_1$) of the gap G to the diameter $D_1$ of the outflow end surface 22t of the honeycomb structure 22.

Accordingly, in the second aspect of the invention, the ratio ($G/D_1$) of the gap G to the diameter $D_1$ of the outflow end surface 22t of the honeycomb structure 22 is specified to be 0.13–0.83. The region corresponds to the gap G of 10 mm or more when $D_1$ is 77 mm or less and the gap G of 50 mm or less when $D_1$ is 50 mm or less. Preferably, the ratio ($G/D_1$) of the gap G to the diameter $D_1$ is within the range from 0.26 to 0.67. This range corresponds to the gap G of 20 mm or more when $D_1$ is 77 mm and the gap G of 40 mm or less when $D_1$ is 60 mm.

How much an exhaust gas flew out of the honeycomb structure 22 can extend in the diametrical direction perpendicular to the axial direction 20a of a honeycomb structure 22 until the gas flow into the honeycomb structure 32 also depends on the length $L_1$ in the axial direction 20a of the honeycomb structure 22. When the length $L_1$ of the honeycomb structure 22 is large, a fluid such as an exhaust gas is directed so as to flow in the axial direction 20a of the honeycomb structure when the fluid passes through the throughholes of the honeycomb structure 22. This is particularly remarkable when a speed of a fluid is high.

In the third aspect of the present invention, a ratio ($G/L_1$) of the gap G to the length $L_1$ of the honeycomb heater 22 in the axial direction 20a is 0.9–6.7. This range corresponds to the gap G of 10 mm or more when the length $L_1$ of the honeycomb structure 22 in the axial direction 20a is 11 mm and the gap G of 50 mm or less when the length $L_1$ is 7.5 mm. A ratio ($G/L_1$) of the gap to the length $L_1$ of the honeycomb structure 22 in the axial direction 20a is preferably 1.3–5.3. The range corresponds to the gap G of 20 mm or more when the length $L_1$ of the honeycomb structure 22 in the axial direction 22a is 15 mm and the gap G of 40 mm or less when the length $L_1$ is 7.5 mm.

In FIG. 1, a duct 16 having a diameter $D_3$ is positioned upstream of the honeycomb structure 22. In order that a fluid may wholly uniformly passes through the inflow end surface 22s of a honeycomb structure 22, an area of the inflow end surface 22s of the honeycomb structure 22 is preferably 1–3 times of an area of the outflow end surface 16s of the duct 16, more preferably 1–2 times, and furthermore preferably 1–1.5 times. Since a diameter of the honeycomb structure 22 can be made small in the present invention, such a structure can be easily obtained.

A length $L_1$ of the honeycomb structure 22 in the axial direction 20a is preferably 5–15 mm, more preferably 5–10 mm, and furthermore preferably 6–9 mm.

Figure 3:
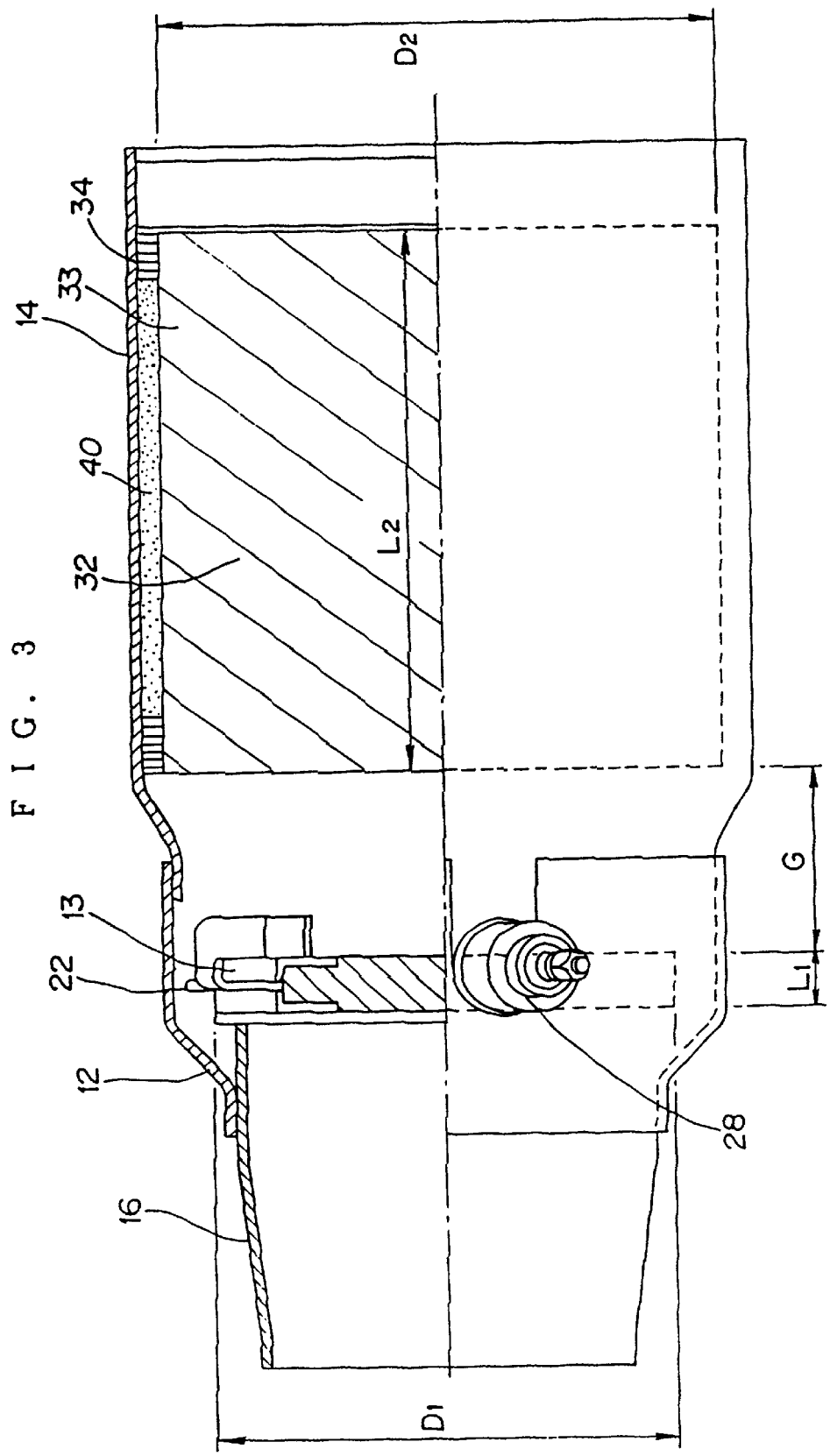
FIG. 3 is a side cross-sectional view showing another embodiment of a catalytic converter according to the present invention.

FIG. 3 shows an embodiment of a catalytic converter of the present invention. The honeycomb structure 22 is fixed to a housing 12 by means of a holding member 13.

A shock absorbing member 40 is positioned between the honeycomb structure 32 and a housing 14. At both ends of the shock absorbing member 40, the honeycomb structure 32 is fixed to the housing 14 by means of a holding member 34 having a shape of a ring.

In honeycomb heaters 20 in FIGS. 1 and 3, an angle between a longitudinal axial direction of an electrode 28 that extends externally with respect to the honeycomb structure and an axial direction 20a of a honeycomb structure 22 is 90°. In a honeycomb heater 20 in FIG. 4, the angle a is specified to be 135°. In the first aspect of the present invention, an area of the inflow end surface 32s of the honeycomb structure 32 is 1.2–10 times of an area of the outflow end surface 22t of the honeycomb structure 22, Accordingly, the electrode 28 came to be able to be arranged so as to make an angle a of 90°–170° by specifying a diameter of the honeycomb structure 22 to be smaller than that of the honeycomb structure 32. This enables to increase a degree of freedom of designing a catalytic converter and to decrease a mounting capacity of the catalytic converter. Incidentally, a conductive member 26 having a shape of a plate ensures conductivity between a honeycomb structure 22 and an electrode 28.

The angle a between an axial direction 20a of the honeycomb structure 22 and an axial direction of the electrode 28 is preferably 90°–170°, more preferably 120°–150°.

Figure 5:
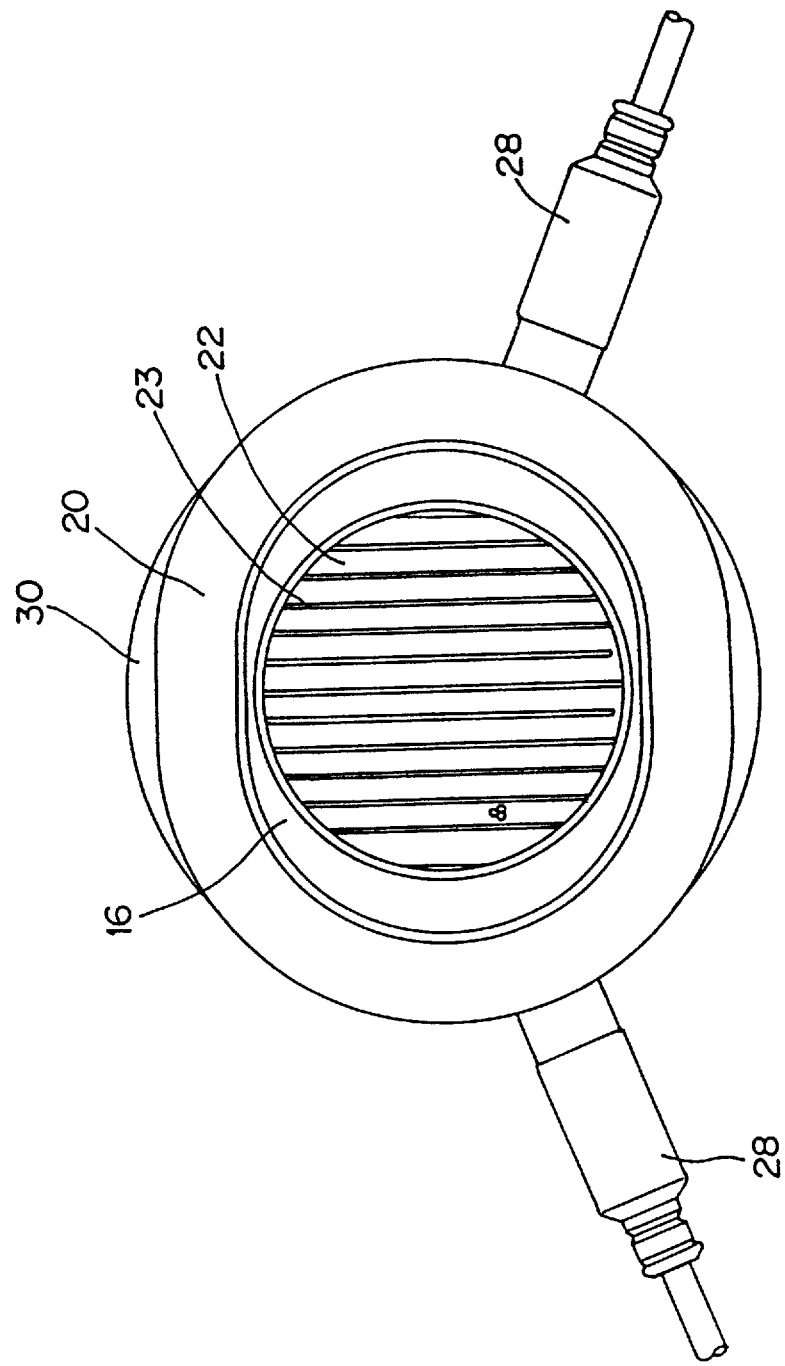
FIG. 5 is a side cross-sectional view showing yet another embodiment of a catalytic converter according to the present invention.
Figure 6:
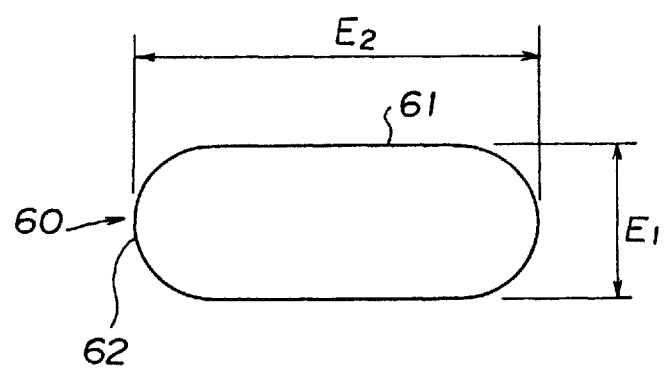
FIG. 6 is an explanatory view showing an oval.

In FIG. 5, a horizontal cross-section of the honeycomb structure 22 may also have a shape of an oval. In FIG. 6, an oval 60 has a shape consisting of a pair of parallel straight lines 61 and a pair of arcs 62 (typically half circles), both of them are combined with each other in their end portion. A diameter $D_1$ of the outflow end surface 22t of the honeycomb structure 22 in the oval means a distance between a pair of the straight lines 61, i.e., a shorter diameter $E_1$. This is because a vibration resistance of the honeycomb structure 22 depends on the shorter diameter when slits 23 are formed in the honeycomb structure 22.

In FIG. 5, a diameter $D_2$ of the inflow end surface 32s of the honeycomb structure 32 is longer than not only the shorter diameter $E_1$ but also the longer diameter $E_2$ of the honeycomb structure 22. However, the diameter $D_2$ of the inflow end surface 32s of the honeycomb structure 32 may be shorter than the longer diameter $E_2$ of the honeycomb structure 22. A diameter of the outflow end surface of the duct 16 is shorter than the shorter diameter $E_1$ and the longer diameter $E_2$ of the honeycomb structure 22.

A shape of a horizontal cross-section of a honeycomb structure 22 may be oval. When it is oval, the shorter diameter is a diameter $D_1$ of the outflow end surface 22t of the honeycomb structure 22.

A mechanical structure of a honeycomb structure 22 in a honeycomb heater 22 is basically the same as that of a honeycomb structure 32 except for slits 23.

Though a shape of a horizontal cross-section of throughholes in honeycomb structures 22 and 32 is not particularly limited, a shape flexible with expansion and contraction, for example, a hexagon or a polygon having more sides than a hexagon, and a corrugation is preferable.

A cell density, i.e., a density of throughholes in honeycomb structures 22 and 32 is not particularly limited. However, in view of thermal conductivity, catalytic purifying efficiency, etc., the density is preferably 100–800 cell/inch$^2$, more preferably 200–600 cell/inch$^2$. When the density exceeds 800 cell/inch$^2$, a problem in pressure loss of a fluid is caused particularly in the honeycomb structure 32.

As the honeycomb structures 22 and 32, a foil type or an extrusion type can be employed. A foil type of a honeycomb structure is formed by winding up a corrugated foil obtained by rolling. An extrusion type of a honeycomb structure is formed by extruding a powdered metal. However, an extrusion type is preferable in view of durability. In the honeycomb heater 20, the surface of the partition walls of the honeycomb structure 22 may be coated with a catalytic composition.

Since, a gap between the honeycomb structure 22 and the honeycomb structure 32 is wider than a conventional one, in view of reducing a heat loss of an exhaust gas as much as possible, a thickness of a partition wall of the honeycomb structure 32 is desirably 0.14 mm (5.5 mil) or less so that the honeycomb structure 32 has small heat capacity and a temperature rising property of the honeycomb structure 32 is enhanced as much as possible.

As a material for the honeycomb structure 22, any metallic material which is heated by electrifying. Since the honeycomb structure 22 is exposed to an exhaust gas of an automobile, or the like, having a high temperature, an Fe—Cr—Al type of alloy is preferable in view of heat resistance and oxidation resistance.

A material for the honeycomb structure 32 may be a ceramic or a metal. When the honeycomb structure 32 is metallic, the material may be the same as that of the honeycomb structure 22.

A catalytic composition to be loaded on the honeycomb structures 22 and 32 includes a carrier having a large surface area and a catalytic activated substance to be loaded on the carrier. A carrier may be, for example, a powdered or a granulated material of $\gamma$—$Al_2O_3$ type, $TiO_2$ type, $SiO_2$—$Al_2O_3$ type, perovskite type.

A catalytic activated substance may be a noble metal such as platinum (Pt), palladium (Pd), and Rhodium (Rh), a base metal such as Cu, Ni, Cr, and Co. A catalytic composition of 10–100 g in which Pt and Pd of 10–100 g is loaded on a $\gamma$—$Al_2O_3$ type of carrier having a volume of 1 $ft^3$.

A honeycomb heater 20 and a catalytic element 30 may be fixed to metallic housings 12 and 14 by means of a metallic holding member 13. The holding member 13 has a flexible structure like a spring structure so as to absorb displacement occurring in a diametrical direction of the honeycomb structure. The holding member 13 further has a structure having high resistance and strength in the gas flow direction for fixing a honeycomb heater 20 against displacement occurring in the gas flow direction.

A structure of the electrode 28 for electrifying the honeycomb structure 22 constituting a honeycomb heater 20. The electrode 28 is preferably connected with the honeycomb structure 22 and housing 12 by means of a connecting member and a shock absorbing member because a displacement of the honeycomb heater 20 in a direction of a radius can be absorbed.

The present invention is hereinbelow described in more detail on the basis of Examples. However, the present invention is not limited to these Examples.

EXAMPLES 1–7, COMPARATIVE EXAMPLE

Method for Producing Honeycomb Heater
Honeycomb structure:

Fe powder having an average diameter of 44 $\mu$m or less, Cr-30Al powder (wt %), Fe-50Al powder (wt %), Fe-20B powder (wt %) and $Y_2O_3$ powder were mixed together so as to have a mixture having a composition of Fe-12Cr-10Al-0.05B-0.5$Y_2O_3$. Methyl cellulose of 4 g and oleic acid of 1 g were added to the mixture as an organic binder and an antioxidant, respectively. Thus, a base was prepared. Then, a honeycomb compact having a desired size was obtained by extrusion molding.

Subsequently, two plates 26 each having a thickness of 2 mm, a width of 7.6 mm, and length of 12 mm, and the same composition as the honeycomb compact was produced and connected to the circumferential surface of the honeycomb compact.

Then, the honeycomb compact was dried at 90° C. for 16 hours, and subsequently kept at 1325° C. for two hours in a hydrogen atmosphere so as to sinter.

Honeycomb structures 22 each having dimensions shown in Tables 1, 2, and 3 were obtained in the aforementioned manner. Any of the honeycomb structures 22 in Examples 1–7 had a thickness of a partition wall of 0.1 mm, a hexagonal shape of a horizontal cross-section of each throughhole, and a cell density of 450 cells/$inch^2$.

Subsequently, a groove 24 having a width of 1.8 mm and a depth of 5 mm was formed on the circumferential surface of each honeycomb structure 22 by a cylindrical grinder. Further, slits 23 were formed by grinding with a diamond saw in a direction parallel to the axes of the throughholes so that 4 cells might be present between each two adjacent slits. The honeycomb structures 22 were then subjected to a thermal treatment at 1150° C. for 30 minutes in the air so as to obtain the honeycomb structure 22 shown in FIGS. 7A and 7B.

TABLE 1

|  | $D_1$ (mm) | $D_2$ (mm) | $(D_2/D_1)^2$ | $\pi D_1^2/4$ ($cm^2$) |
|---|---|---|---|---|
| Example 1 | 75.0 | 91.5 | 1.488 | 44.179 |
| Example 2 | 63.0 | 82.5 | 1.715 | 31.173 |
| Example 3 | 74.0 | 91.5 | 1.529 | 43.009 |
| Example 4 | 70.0 | 100.0 | 2.041 | 38.485 |
| Example 5 | 63.0 | 91.5 | 2.109 | 31.173 |
| Example 6 | 75.0 | 105.0 | 1.960 | 44.179 |
| Example 7 | 88.0 | 91.5 | 1.081 | 60.821 |
| Comparative Example | 88.0 | 91.5 | 1.081 | 60.821 |

TABLE 2

|  | $D_1$ (mm) | $L_1$ (mm) | G (mm) | $G/D_1$ | $G/L_1$ |
|---|---|---|---|---|---|
| Example 1 | 75.0 | 8.0 | 30.4 | 0.405 | 3.80 |
| Example 2 | 63.0 | 9.8 | 25.0 | 0.397 | 2.55 |
| Example 3 | 74.0 | 7.6 | 30.0 | 0.405 | 3.95 |
| Example 4 | 70.0 | 8.0 | 30.0 | 0.429 | 3.75 |
| Example 5 | 63.0 | 8.0 | 30.0 | 0.476 | 3.75 |
| Example 6 | 75.0 | 8.0 | 30.0 | 0.400 | 3.75 |
| Example 7 | 88.0 | 7.6 | 30.0 | 0.341 | 3.95 |
| Comparative Example | 88.0 | 7.6 | 6.65 | 0.076 | 0.88 |

TABLE 3

|  | Resistance of Honeycomb structure 22 (m$\Omega$) | Honeycomb structure 32 $L_2$ (mm) | Volume ($cm^3$) |
|---|---|---|---|
| Example 1 | 350 | 87.8 | 577 |
| Example 2 | 200 | 90.5 | 484 |
| Example 3 | 350 | 121.7 | 800 |
| Example 4 | 200 | 87.8 | 577 |
| Example 5 | 200 | 87.8 | 577 |
| Example 6 | 350 | 87.8 | 577 |
| Example 7 | 350 | 121.7 | 860 |
| Comparative Example | 350 | 121.7 | 800 |

Method for producing catalytic composition:

$\gamma$-$Al_2O_3$ powder and $CeO_2$ powder were mixed so as to have a weight ratio of 7:3, respectively. To the mixture were added water and a very small amount of nitric acid. Then, the mixture was ground in a wet method so as to prepare a slurry for loading. A wash coat layer was formed on the honeycomb structure 10 with the slurry for loading in a dipping process. Then, the wash coat layer is dried, and fired at 700° C. so as to coat $\gamma$—$Al_2O_3$ powder and $CeO_2$ therewith. Subsequently, platinum (Pt) and Rhodium (Rh) were loaded by immersing honeycomb structure 10 for about 2 minutes in an aqueous solution containing chloroplatinic acid and rhodium nitrate and so that a molar ratio of platinum and rhodium is 5:1 and a total loaded amount of 40 g/ft$^3$.

Figure 8:
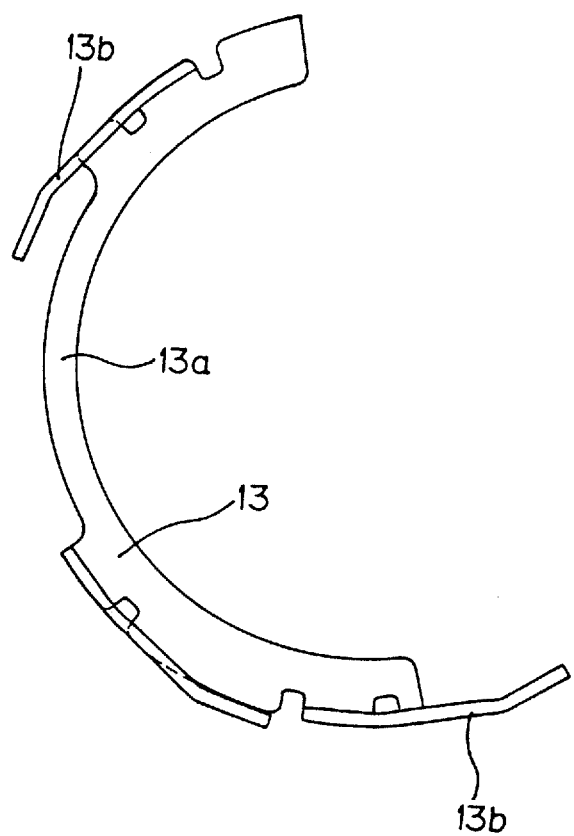
FIG. 8 is a plan view showing an embodiment of a holding member.

A honeycomb structure 22 was fixed to a housing 12 by means of two holding members 13. In FIG. 8, a holding member 13 has a half-ringed portion 13a and leg portions 13b fixed to the circumferential surface of the half-ringed portion 13a. Two half-ringed portions 13a form a shape of a ring.

Two members are made of steel SUS310S. The half-ringed portion 13a has a shape of a half circular having a thickness of 1.5 mm and a difference between the inner diameter and the outer diameter of 4.0 mm. Each of the six leg portions 13b has a thickness of 1.5 mm, width of 8 mm, and length of 18 mm. An insulating coat 13c was coated on the half-ringed portion 13a of the holding member 13.

The insulating coat 13c may be a coat in which a heat resistant inorganic material such as glass (crystallized glass), ceramic, cement, or the like, by means of enameling, irradiating, ceramic coating, cement coating, etc. Though it is not shown in FIG. 9, an insulating coat may be coated on the surface forming a groove 24 of a honeycomb structure 22.

Figure 9:
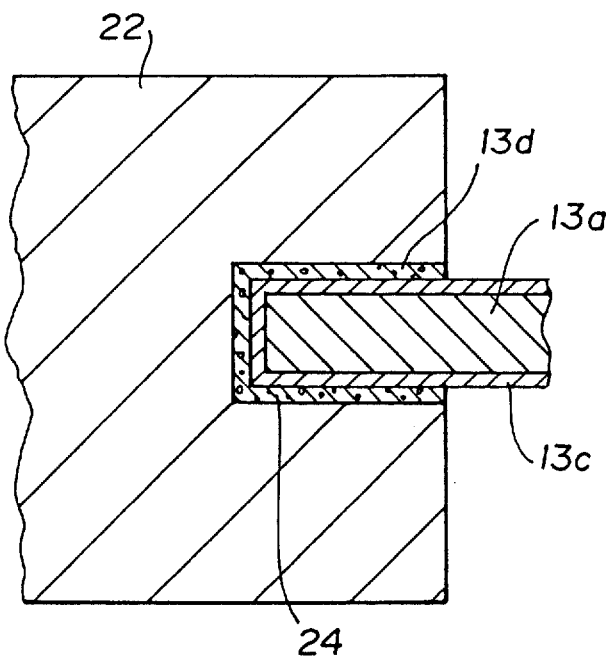
FIG. 9 is a partial cross-sectional view showing a circumferential portion of a honeycomb structure of a honeycomb heater.

Then, a spacer having a thickness of 0.8 mm was inserted into a portion except for a groove 24 of a slit 23 formed in the honeycomb structure 22 and was held temporarily. Subsequently, as shown in FIG. 9, the groove 24 was filled with an inorganic cement 13d, two holding members 13 were inserted there, the honeycomb heater was dried at 100° C. for one hour and at 300° C. for one hour in the air to be fixed. As the inorganic cement 13d, a bond #96 containing $SiO_2$—$Al_2O_3$ as a main component produced by Nissan Chemical Industries, Ltd. was used. After drying, the spacer was released, connecting portions of two holding members 13 were connected by welding so as to have a ringed shape shown in FIG. 10. Incidentally, as a connecting member 13d, there may be used a heat resistant inorganic cement of $Al_2O_3$, $ZrO_2$, $SiO_2$—$Al_2O_3$ or the like.

An electrode 28 having a wire was provided with a conductive plate (connecting member) of SUS409 having a thickness of 1.0 mm, a width of 8 mm, and a length of 41.5 mm, the plate being arched with R of 46 mm in the direction of the length. The electrode 28 was fixed to the honeycomb structure 22 by welding one end of a conductive plate 29 is welded to a plate portion 26 of the honeycomb structure 22.

Figure 10:
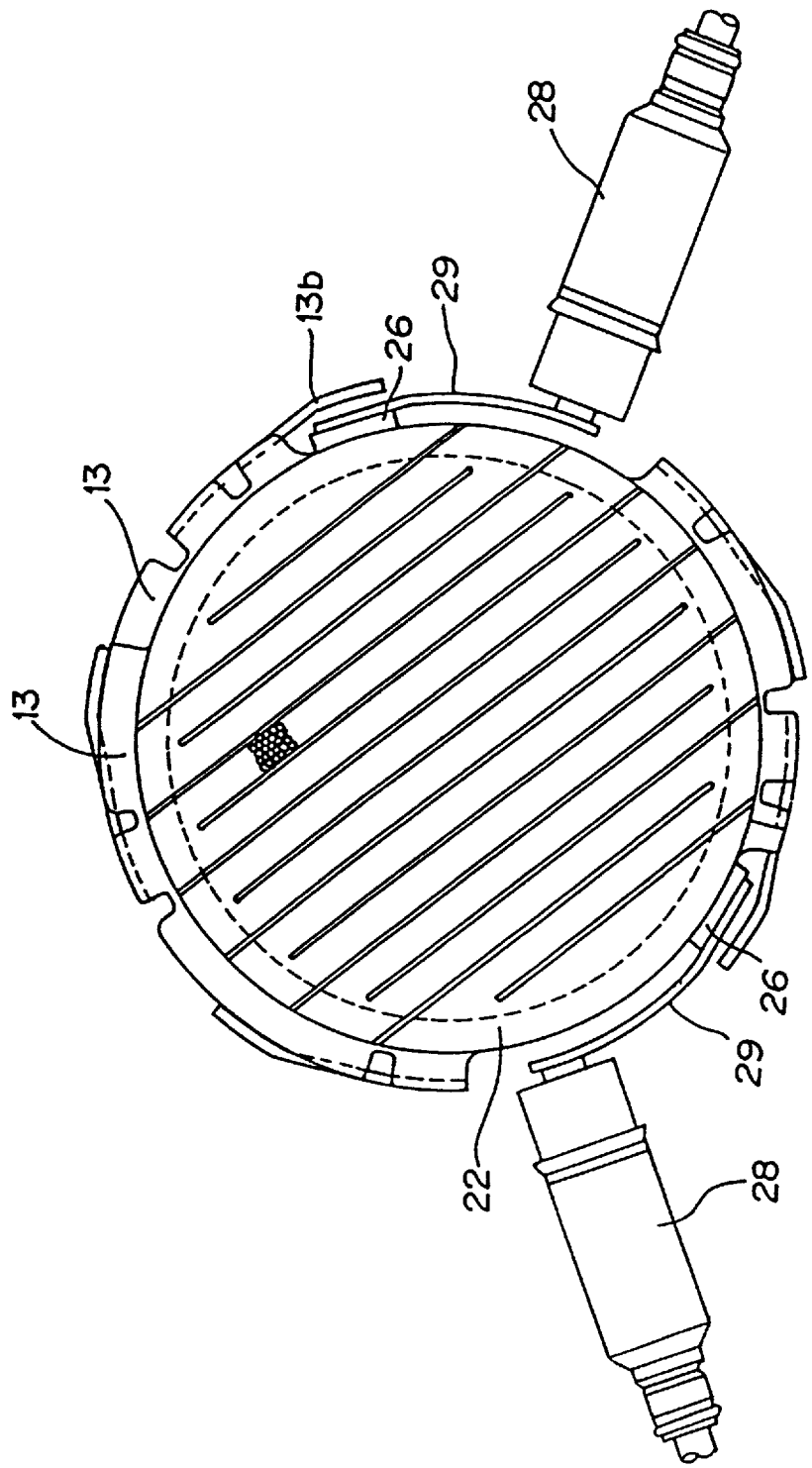
FIG. 10 is a plan view showing an embodiment of a honeycomb heater to which electrodes are attached.
Figure 11:
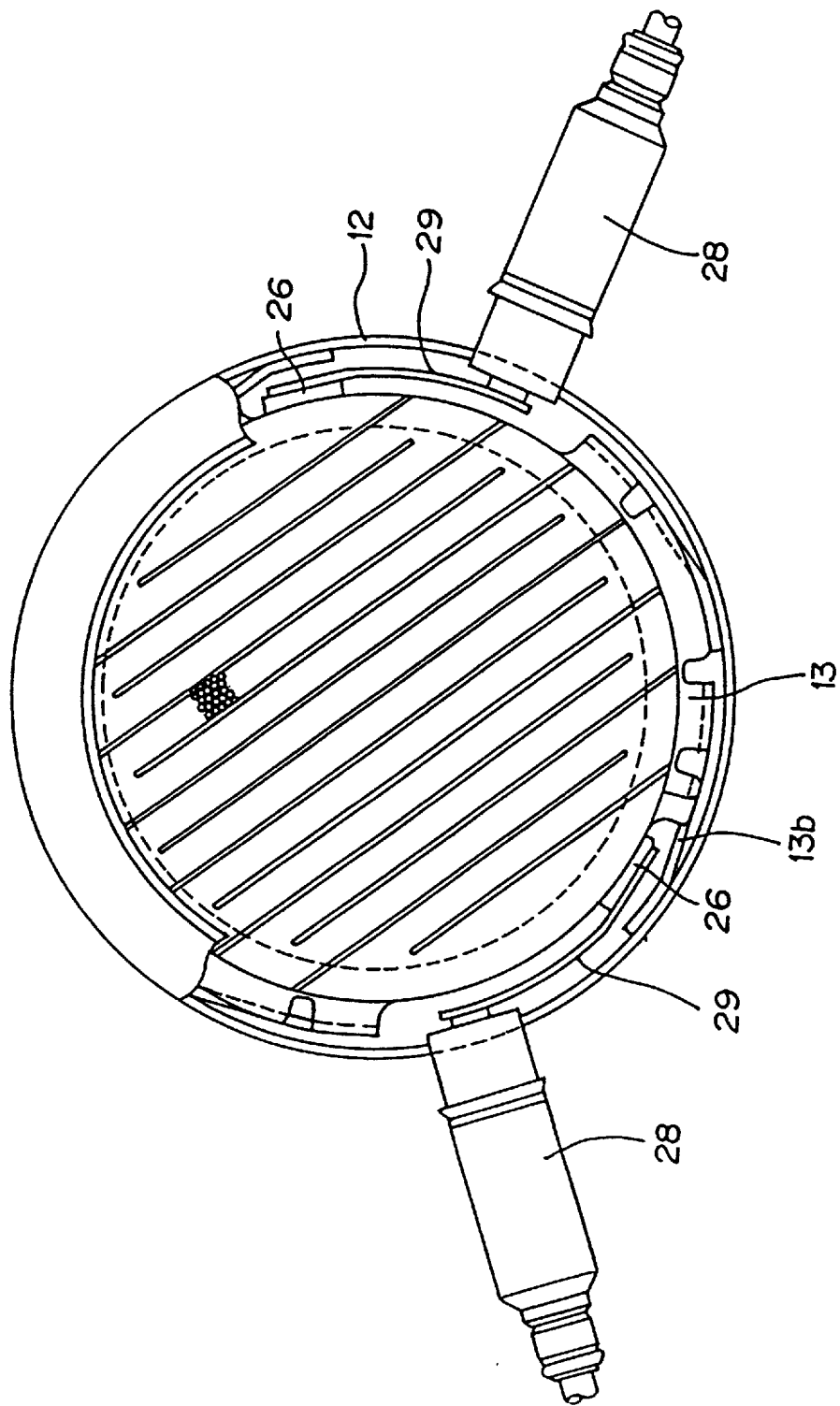
FIG. 11 is a plan view showing a state that a honeycomb heater is engaged with a housing.

Thus obtained honeycomb heater 20 shown in FIG. 10 was engaged with a housing 12 (SUS409, thickness of 1.5 mm). Leg portions 13b of a holding member and a circumferential portion of the electrode 28 having a wire were fixed to the housing by welding.

Then, a duct (SUS409, thickness of 1.5 mm) 16 was fixed to the housing 12 by welding so as to have a gap of 2 mm between the honeycomb structure 22 and the duct 16.

Method for producing a catalytic element:

Any of the honeycomb structures 32 in Examples 1–7 has a columnar shape made of cordierite, has a thickness of a partition wall of 0.139 mm, and has a square shape of a horizontal cross-section of a throughhole. In Examples 1 and 2, a cell density was 350 cell/inch$^2$, and in Examples 3, a cell density of 600 cell/inch$^2$. An outer diameter $D_2$ and a length $L_2$ of an axial direction are shown in Tables 1–3. A catalytic component was loaded on a honeycomb structure in the same manner as in honeycomb structure 20.

A shock absorbing member 40 made of a mat [Interam (trade name) produced by 3M] was wound around the honeycomb structure 32. The honeycomb structure 32 was inserted into a housing (SUS310S, thickness of 1.5 mm) 14 by pressing and pressed by retainer rings (holding members) 34 from both end surface sides and welded to the housing 14.

A catalytic converter was obtained by fixing thus obtained catalytic unit 31 by welding so that a gap between an outflow end surface of a heater unit 21 and the retainer rings 34 has a predetermined thickness.

Figure 4:
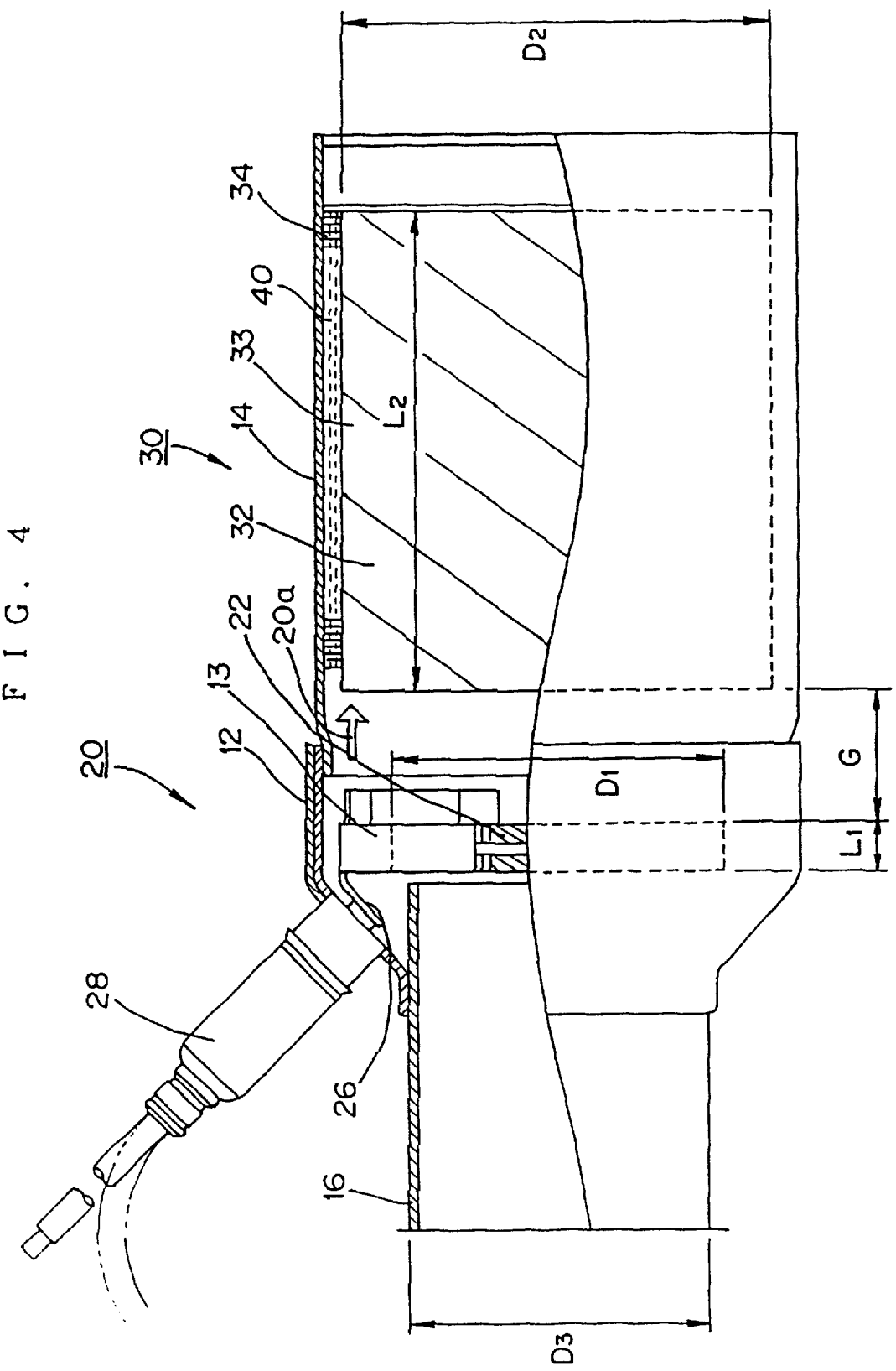
FIG. 4 is a side cross-sectional view showing still another embodiment of a catalytic converter according to the present invention.

In Examples 1, 2, and 3 converters shown in FIGS. 3, 4, and 5, respectively, are obtained. In Example 7, dimensions of the honeycomb structure 22 are the same as those in Comparative Example. However, a gap G in Example 7 is 30 mm longer than that in Comparative Example.

Figure 12:
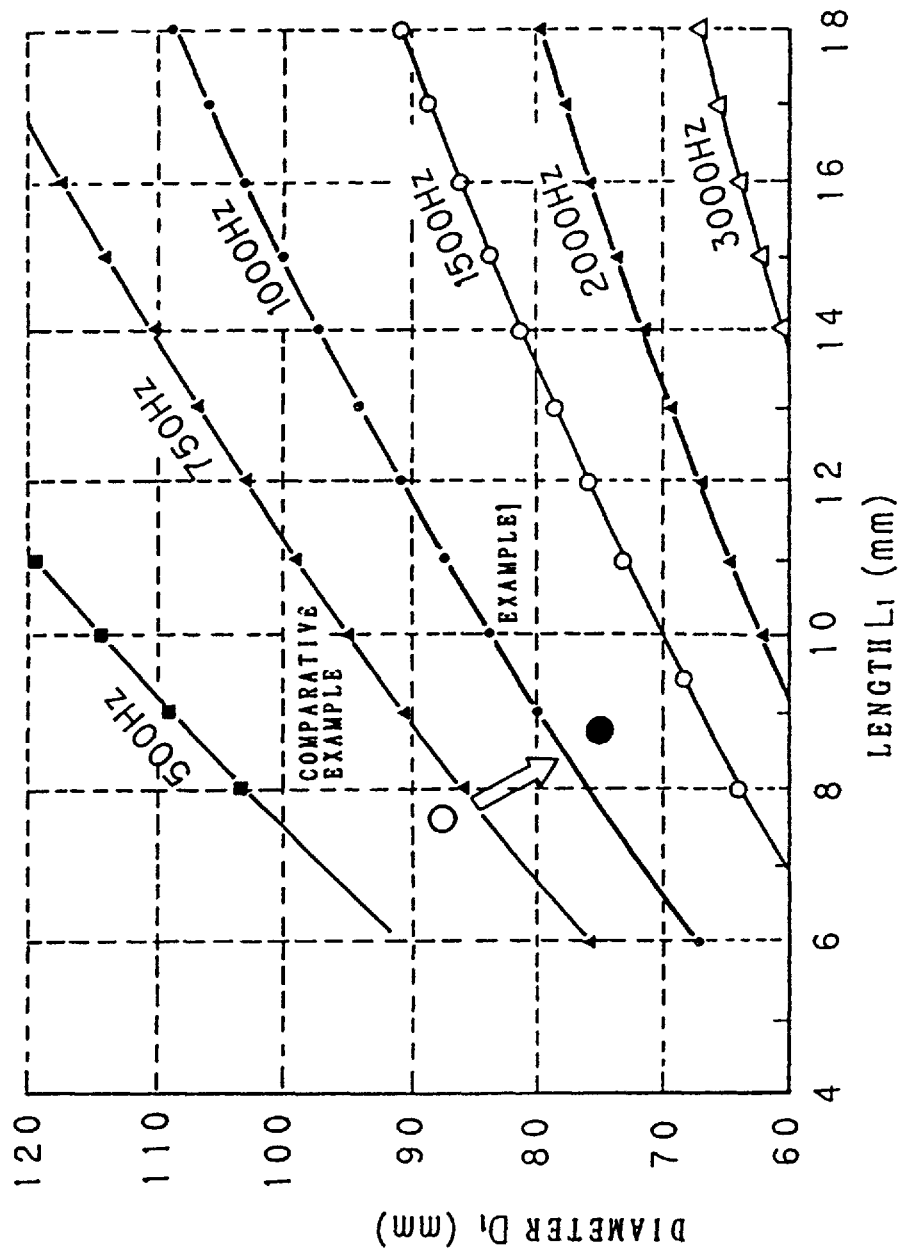
FIG. 12 is a chart showing a correlation between a length $L_1$ in the axial direction and a diameter $D_1$ with a parameter of a proper oscillation frequency in a honeycomb structure of a honeycomb heater.

As shown in FIG. 12, when honeycomb structure 22 is small, a proper oscillation frequency in a honeycomb structure 22 increases, and vibration resistance of a honeycomb heater 20 improves. A proper oscillation frequency of a honeycomb structure 22 is calculated by the following formulae.

$$Fn = \pi^2/2\pi L^2 (EIg/w)^{1/2} \qquad \text{Formulae 1}$$

$$EI = 16.3 N_R H^3$$

Fn: Frequency
π: Ratio of the circumference of a circle to its diameter (about 3.1416).
g: Gravitational constant
w: Mass of a honeycomb structure per unit length of an axial direction 20a
L: Diameter in a groove
$N_R$: Number of partition walls between each adjacent slits
H: Length of a honeycomb structure in an axial direction 20a

TEST

Figure 13:
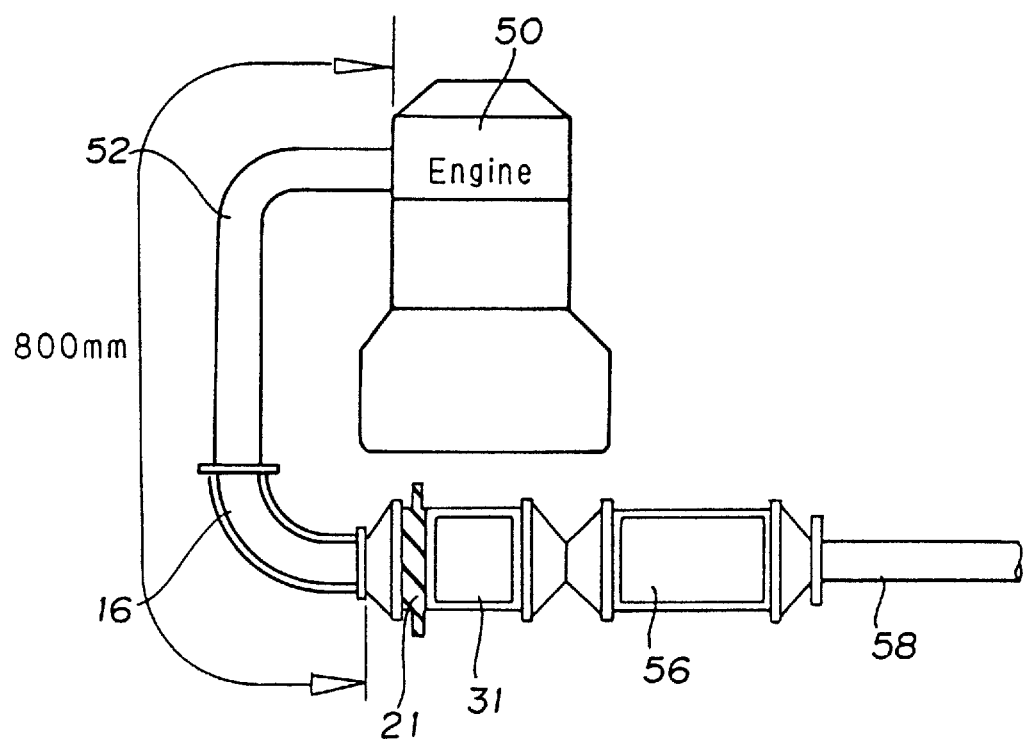
FIG. 13 is an explanatory view showing a method for testing a catalytic converter.

As shown in FIG. 13, an obtained honeycomb unit 21 and a catalytic unit 31 are connected to an engine 50 by means of ducts 52 and 16. A main catalytic unit 56 is connected downstream of the catalytic unit 31. So called three-way catalyst is loaded on the main catalytic unit 56. Exhaust gas is removed via exhaust pipe 58.

The obtained catalytic converter was subjected to a 100-hour acceleration durability test, in which the catalytic converter was exposed to a temperature of 750° C. for 60 minutes with using an engine exhaust gas and with five seconds of fuel cut. The cycle was repeated for 100 hours.

Then, in an automobile having a 2.0-liter capacity and a 4-cylindered engine, a catalytic converter was positioned 750 mm away from an exhaust gas. Downstream of the catalytic converter was disposed the main catalytic unit 56 having a 1.7-liter capacity (already subjected to a 100-hour acceleration durability test). In the catalytic converter, a heater unit 21 and a catalytic unit 31 were fixed to a housing by welding. Incidentally, a secondary air introducing hole is positioned 150 mm away from the inflow end surface of a honeycomb heater 21. Together with an introduction of a secondary air and electrification of 2 KW for 0–30 seconds (after engine is cranked up) upon cold start-up of FTP test using a constant-voltage generator. The 10 results of the obtained Bag1A (0–140 seconds) are shown in FIG. 14.

Figure 14:
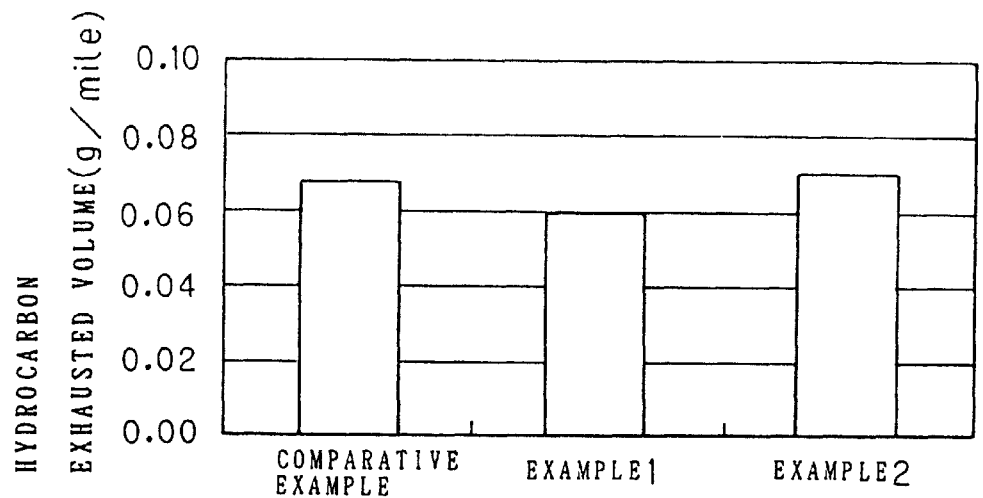
FIG. 14 is a graph showing an exhausted volume of hydrocarbon per mile in a catalytic converter.
Figure 15:
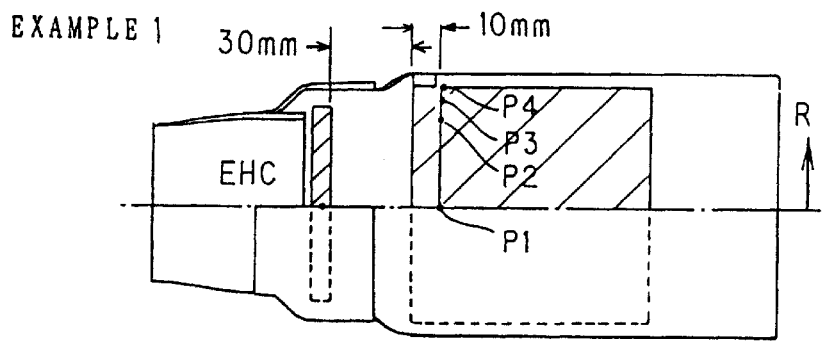
FIGS. 15A and 15B are cross-sectional views of catalytic converters.
Figure 15:
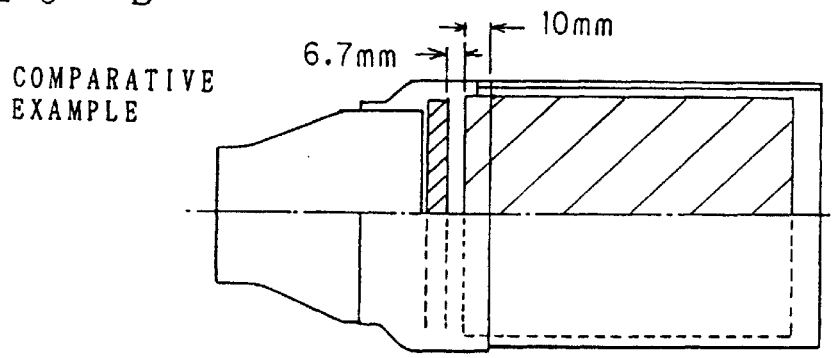

In FIG. 14, it is understandable by comparing Example 1 and Comparative Example that an exhaust volume of HC decreases by increasing a gap G. An exhaust volume of HC in Example 2 is a little higher than that in a Comparative Example. However, a volume of a honeycomb structure 32 in Example 2 is 484 cm$^3$, which is about 20% smaller than a volume (577 cm$^3$) of a honeycomb structure 32 of a Comparative Example. If the difference of the volumes is considered, it can be thought that a catalytic converter in Example 2 has more improved purification ability than a catalytic converter in Comparative Example.

FIGS. 15A, 15B, 16A, 16B, 16C, 16D, and 16E relate to a measurement of a temperature-rising property of a honeycomb structures 22 and 32 when a catalytic converter is electrified. In any of FIGS. 16A, 16B, 16C, 16D, and 16E, a full line show a temperature in Example 1 of FIG. 15A, and a broken line show a temperature in Comparative Example of FIG. 15B.

Figure 16A:
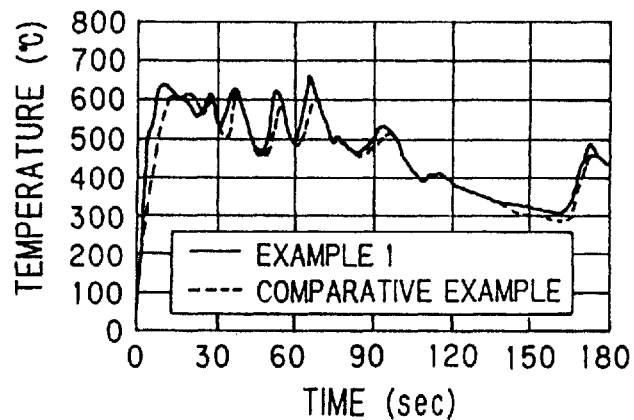
FIG. 16A is a graph showing a thermal property of a honeycomb structure of a honeycomb heater at a central axis.

FIG. 16A shows results of measuring temperatures in the center of a honeycomb structure 22. FIGS. 16B, 16C, 16D, and 16E show results of measuring temperatures in the positions R of $P_1=0$ m, $P_2=33$ mm, $P_4=40$ mm and $P_4=45$ mm, respectively, from the center toward the circumference in a horizontal cross-section taken in the position of 10 mm from an inflow end surface 32s (see FIG. 15A). Incidentally, a radius of a honeycomb structure 32 is 45.8 mm in Example 1 and Comparative Example.

Figure 16B:
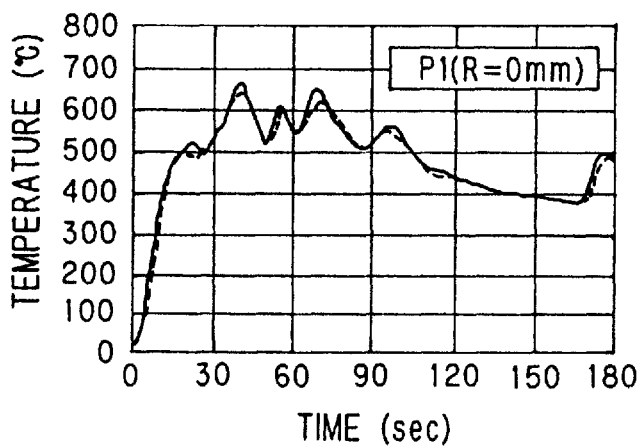
FIGS. 16B, 16C, 16D, and 16E are graphs showing a thermal property of a honeycomb structure of a catalytic element.
Figure 16C:
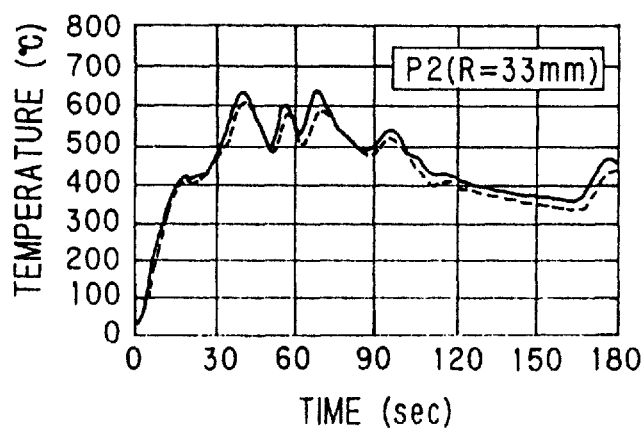
Figure 16D:
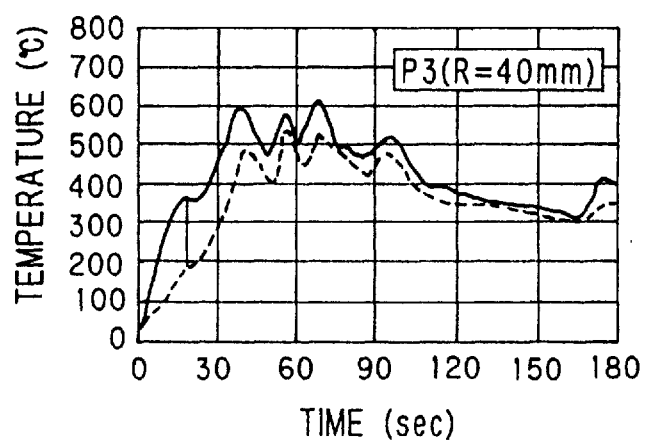
Figure 16E:
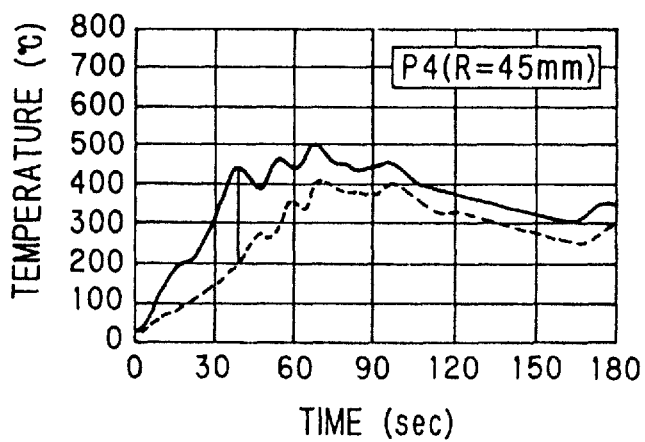

FIGS. 16B and 16C show that a temperature-rising property in the central portion of a honeycomb structure 32 in both Example 1 and Comparative Example. FIGS. 16D and 16E show that a temperature does not rise in a short period of time in a peripheral portion 33 of the honeycomb structure 32 in Comparative Example, while in Example 1, a temperature rises quickly.

DEFORMATION TEST

For first one minute, an internal combustion engine is put in motion in an idling condition, and simultaneously an electric power is increased from zero to a predetermined value. Then, the power supply is stopped, and for the next 20 minutes, the internal combustion engine is put in motion under a severe driving condition with a rated number of revolution. For the next one minute, the internal combustion engine is put in motion in an idling condition. Then, for the next 15 minutes, the internal combustion engine is stopped. The cycle was repeated, and a honeycomb structure 22 of a honeycomb heater 20 was measured for deformation. In order to express a volume of deformation of a honeycomb structure 22, a value obtained by deducting a shortest distance of adjacent slits from the longest one was used as a parameter.

Figure 17:
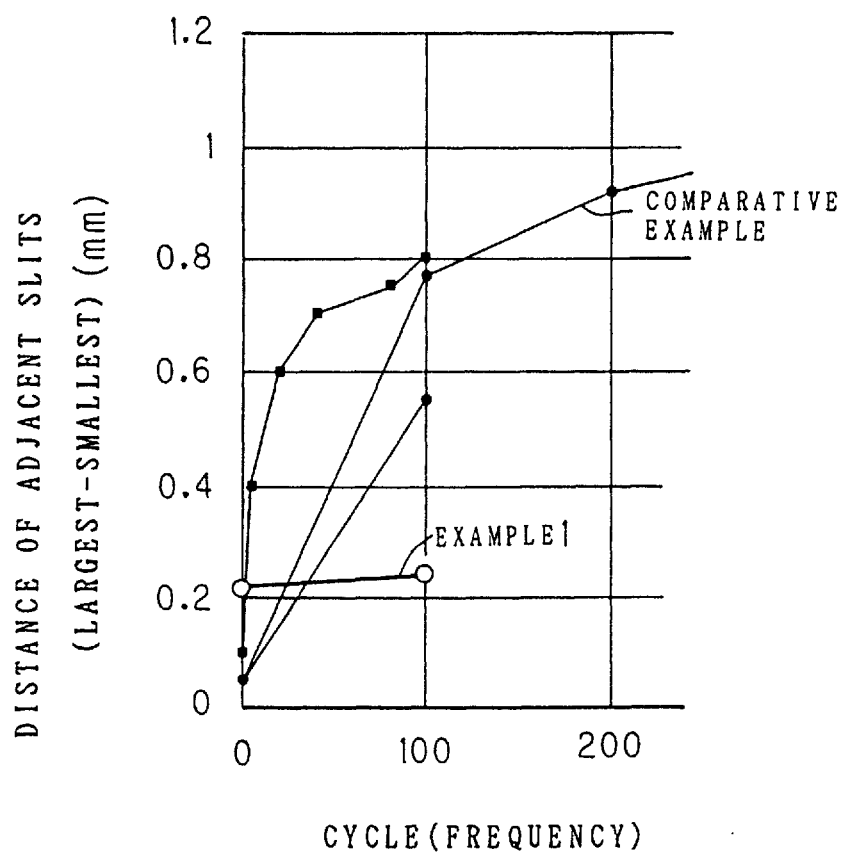
FIG. 17 is a graph showing a deformation of a honeycomb structure of a honeycomb heater.
Figure 19:
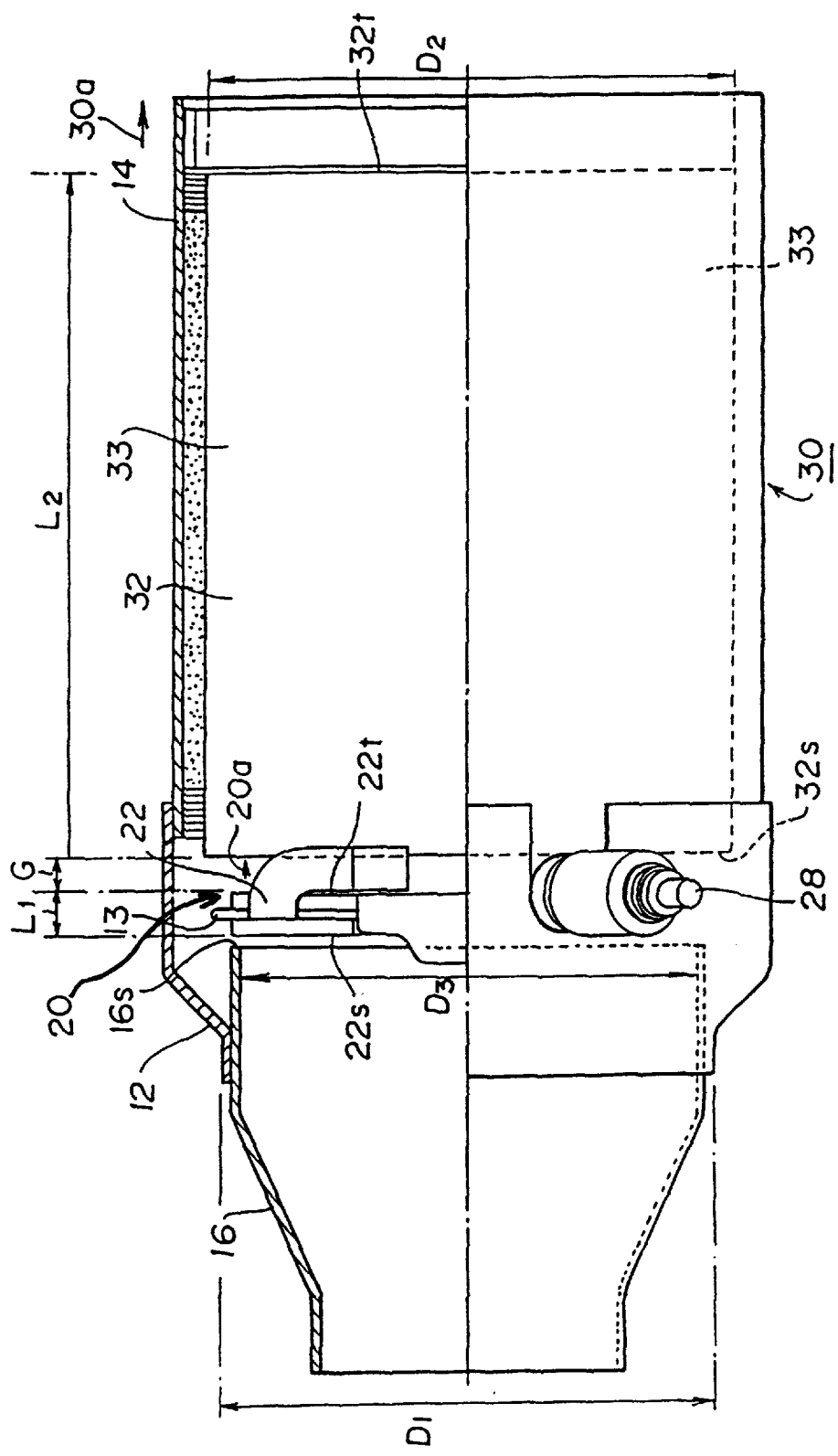
FIG. 19 is a side cross-sectional view showing a constitution of a conventional catalytic converter.

FIG. 17 shows a movement of deformation of the honeycomb structure 22. From FIG. 17, it is understood that a honeycomb structure 22 in Example 1, having a diameter of 75 mm has less deformation than a honeycomb structure 22 in Comparative Example, having a diameter of 88 mm.

FIG. 18 shows a heat capacity of a honeycomb structure 22. The heat capacity was obtained under the conditions that a thickness of a partition wall is 1.0 mm, a cell density is 450 cell/inch$^2$, a catalytic composition is loaded on a honeycomb structure at a rate of 0.09 g/cm$^3$.

FIG. 18 shows that a heat capacity decreases according to a decrease of a diameter $D_1$ of a honeycomb structure 22.

For example, a honeycomb structure 22 in Example 1, i.e., a honeycomb structure having a diameter $D_1$ of 75 mm and a length $L_1$ of 8.0 mm has a heat capacity of 20J/° C. A honeycomb structure 22 in Comparative Example, i.e., a honeycomb structure having a diameter $D_1$ of 88 mm and a length $L_1$ of 7.6 mm has a heat capacity of 30J/° C. When an electric power of 2 KW is supplied, the honeycomb structure has a temperature rise of 67° C. per minute.

Incidentally, a honeycomb structure 22 having a diameter $D_1$ of 75 mm and a length of $L_1$ of 8.0 mm has a heat capacity of 23J/° C., and when an electric power of 2 KW is supplied, the honeycomb structure has a temperature rise of 87° C. per minute.

As described above, in the present invention, an area of a horizontal cross-section of a honeycomb structure of a honeycomb heater is made smaller than a honeycomb structure of a catalytic element, thereby improving a durability of a honeycomb structure, particularly resistance against vibrations extending over a long period of time, with maintaining an exhaust gas purification ability under severe conditions during driving an automobile, or the like. Further, according to the present invention, temperature of a honeycomb heater can be raised up for a short period of time. Furthermore, according to the present invention, a distance between a honeycomb heater and a catalytic element is enlarged more than predetermined distance, thereby improving a response of a catalytic element to a temperature rise in a peripheral portion of a honeycomb structure.

What is claimed is:

1. A catalytic converter, comprising:

a housing;

a honeycomb heater fixed inside said housing; and a catalytic element disposed downstream of said honeycomb heater;

wherein said honeycomb heater comprises:

a first honeycomb structure comprising metal having a first partition wall having a plurality of first throughholes, and at least one electrode for electrifying said first honeycomb structure, attached to said first honeycomb structure; said first honeycomb structure having a first inflow end surface into which a fluid can flow into said first throughholes, and a first outflow end surface from which the fluid can pass out through said first throughholes; and said catalytic element comprises:

a second honeycomb structure having a second partition wall having a plurality of second throughholes, and a catalytic compound loaded on said second honeycomb structure; the second honeycomb structure having a second inflow end surface into which the fluid can flow into said second throughholes, and a second outflow end surface from which the fluid can pass out through said second throughholes; and wherein an area of the second inflow end surface of said second honeycomb structure is 1.2–10 times of an area of the first outflow end surface of said first honeycomb structure and a gap between the first outflow end surface of said first honeycomb structure and the second inflow end surface of said second honeycomb structure is about 20 mm and less than or equal to 50 mm.

2. A catalytic converter according to claim 1, wherein said area of the second inflow end surface of said second honeycomb structure is 1.3–5 times of said area of the first outflow end surface of said first honeycomb structure.

3. A catalytic converter according to claim 1, wherein said area of the second inflow end surface of said second honeycomb structure is 1.4–3 times of said area of the first outflow end surface of said first honeycomb structure.

4. A catalytic converter according to claim 1, wherein an angle between a longitudinal axial direction extending externally from the first honeycomb structure of said electrode and an axial direction of the first honeycomb structure is 90°–170°.

5. A catalytic converter according to claim 1, wherein an angle between a longitudinal axial direction extending externally from the first honeycomb structure of said electrode and an axial direction of the first honeycomb structure is 120°–150°.

6. A catalytic converter according to claim 1, wherein an area of the first outflow end surface is 64 cm² or less.

7. A catalytic converter according to claim 6, wherein an area of the first outflow end surface is 45 cm² or less.

8. A catalytic converter according to claim 1, wherein the first inflow end surface of the first honeycomb structure is joined to a duct for introducing a fluid and an area of the first inflow end surface is 1–3 times as large as an area of a third outflow end surface of the duct.

9. A catalytic converter according to claim 1, wherein the first inflow end surface of the first honeycomb structure is joined to a duct for introducing a fluid, and an area of the first inflow end surface is 1–2 times as large as an area of a third outflow end surface of the duct.

10. A catalytic converter according to claim 1, wherein the first honeycomb structure is a sintered monolithic body.

11. A catalytic converter according to claim 1, wherein the second honeycomb structure comprises ceramic materials.

12. A catalytic converter according to claim 1, wherein the second honeycomb structure has a wall thickness of 0.14 mm (5.5 mil) or less.

13. A catalytic converters comprising:

a housing;

a honeycomb heater fixed inside said housing; and a catalytic element disposed downstream of said honeycomb heater;

wherein said honeycomb heater comprises:

a first honeycomb structure comprising metal having a first partition wall having a plurality of first throughholes, and at least one electrode for electrifying said first honeycomb structure, attached to said first honeycomb structure; said first honeycomb structure having a first inflow end surface into which a fluid can flow into said first throughholes, and a first outflow end surface from which the fluid can pass out through said first throughholes; and said catalytic element comprises:

a second honeycomb structure having a second partition wall having a plurality of second throughholes and a catalytic compound loaded on said second honeycomb structure; the second honeycomb structure having a second inflow end surface into which the fluid can flow into said second throughholes, and a second outflow end surface from which the fluid can pass out through said second throughholes; and wherein a ratio of G to D1 ($G/D_1$) is 0.13–0.83, G being a gap between the first outflow end surface of the first honeycomb structure and the second inflow end surface of the second honeycomb structure, and $D_1$ being a diameter of the first outflow end surface of the first honeycomb structure and G is about 20 mm and less than or equal to 50 mm.

14. A catalytic converter comprising:

a housing;

a honeycomb heater fixed inside said housing; and a catalytic element disposed downstream of said honeycomb heater;

wherein said honeycomb heater comprises:

a first honeycomb structure comprising metal having a first partition wall having a plurality of first throughholes, and at least one electrode for electrifying said first honeycomb structure, attached to said first honeycomb structure; said first honeycomb structure having a first inflow end surface into which a fluid can flow into said first throughholes, and a first outflow end surface from which the fluid can pass out through said first throughholes; and said catalytic element comprises:

a second honeycomb structure having a second partition wall having a plurality of second throughholes, and a catalytic compound loaded on said second honeycomb structure; the second honeycomb structure having a second inflow end surface into which the fluid can flow into said second throughholes, and a second outflow end surface from which the fluid can pass out through said second throughholes; and wherein a ratio of G to $L_1$ ($G/L_1$) is 0.9–6.7, G being a gap between the first outflow end surface of the first honeycomb structure and the second inflow end surface of the second honeycomb structure, and $L_1$ being a length of the first honeycomb structure in the axial direction and G is about 20 mm and less than or equal to 50 mm.

15. A catalytic converter according to claim 14, wherein the ratio of said gap G to said length $L_1$ ($G/L_1$) is 1.3–5.3.

16. A catalytic converter according to claim 14, wherein said gap G is 20–40 mm.

17. A catalytic converter according to claim 14, wherein said length $L_1$ is 5–15 mm.

* * * * *